(12) United States Patent
Kase

(10) Patent No.: US 10,326,528 B2
(45) Date of Patent: Jun. 18, 2019

(54) OPTICAL TRANSCEIVER AND CONTROL METHOD FOR OPTICAL TRANSCEIVER

(71) Applicant: FUJITSU LIMITED, Kawasaki-shi, Kanagawa (JP)

(72) Inventor: Mariko Kase, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/886,960

(22) Filed: Feb. 2, 2018

(65) Prior Publication Data

US 2018/0227057 A1 Aug. 9, 2018

(30) Foreign Application Priority Data

Feb. 8, 2017 (JP) .................................. 2017-020984

(51) Int. Cl.
*H04B 10/40* (2013.01)
*G02B 6/42* (2006.01)
*H04B 10/079* (2013.01)
*H04B 10/25* (2013.01)

(52) U.S. Cl.
CPC ............... *H04B 10/40* (2013.01); *G02B 6/42* (2013.01); *H04B 10/079* (2013.01); *H04B 10/2503* (2013.01)

(58) Field of Classification Search
USPC ........................................................ 398/151
See application file for complete search history.

(56) References Cited

U.S. PATENT DOCUMENTS

| 4,948,210 A * | 8/1990 | Simms ................... G02B 27/20 250/338.1 |
| 2002/0024703 A1* | 2/2002 | Lee ..................... H04B 10/0771 398/141 |
| 2002/0110304 A1* | 8/2002 | Werkheiser .......... G02B 6/3803 385/8 |
| 2011/0013905 A1* | 1/2011 | Wang ..................... G01M 11/33 398/21 |
| 2012/0328304 A1* | 12/2012 | Ikushima ............... H04B 10/07 398/140 |

FOREIGN PATENT DOCUMENTS

| JP | 2003-032189 | 1/2003 |
| WO | 2012/093431 | 7/2012 |

\* cited by examiner

*Primary Examiner* — Kenneth N Vanderpuye
*Assistant Examiner* — David W Lambert
(74) *Attorney, Agent, or Firm* — Fujitsu Patent Center

(57) ABSTRACT

There is provided an optical transceiver including a laser light source configured to transmit a first optical signal via an optical transmission member having optical fibers, a photodetector configured to receive a second optical signal via the optical transmission member, a visible light source configured to emit visible light which is incident to the optical transmission member, and a control circuit configured to, when the photodetector detects not to receive the second optical signal, control the laser light source to stop transmitting the first optical signal and the visible light source to start emitting the visible light.

6 Claims, 22 Drawing Sheets

OPTICAL TRANSCEIVER AND CONTROL METHOD FOR OPTICAL TRANSCEIVER

CROSS-REFERENCE TO RELATED APPLICATION

This application is based upon and claims the benefit of priority of the prior Japanese Patent Application No. 2017-020984, filed on Feb. 8, 2017, the entire contents of which are incorporated herein by reference.

FIELD

The embodiments discussed herein are related to an optical transceiver and a control method for the optical transceiver.

BACKGROUND

In the related art, an optical transceiver that transmits and receives an optical signal by an optical fiber and the like is known. Further, as a configuration for a connection detecting function, a transmission device is known which includes a light emitting device for a connection detection, such as a light emitting diode emitting exited light including light of a predetermined wavelength (see, e.g., International Publication Pamphlet No. WO 2012/093431).

Related technologies are disclosed in, for example, International Publication Pamphlet No. WO 2012/093431.

SUMMARY

According to an aspect of the invention, an optical transceiver includes a laser light source configured to transmit a first optical signal via an optical transmission member having optical fibers, a photodetector configured to receive a second optical signal via the optical transmission member, a visible light source configured to emit visible light which is incident to the optical transmission member, and a control circuit configured to, when the photodetector detects not to receive the second optical signal, control the laser light source to stop transmitting the first optical signal and the visible light source to start emitting the visible light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the related art, for example, when an optical input interruption is detected at a receiving side of an optical transceiver, an operator may not confirm whether the light reaches up to an end portion of an optical fiber while protecting the eyes of the operator.

An embodiment of a technology which enables an operator to confirm whether the light reaches up to an end portion of an optical fiber while protecting the eyes of the operator will be described in detail with reference to the accompanying drawings.

First Embodiment (Optical Transmission System According to First Embodiment)

Figure 1:
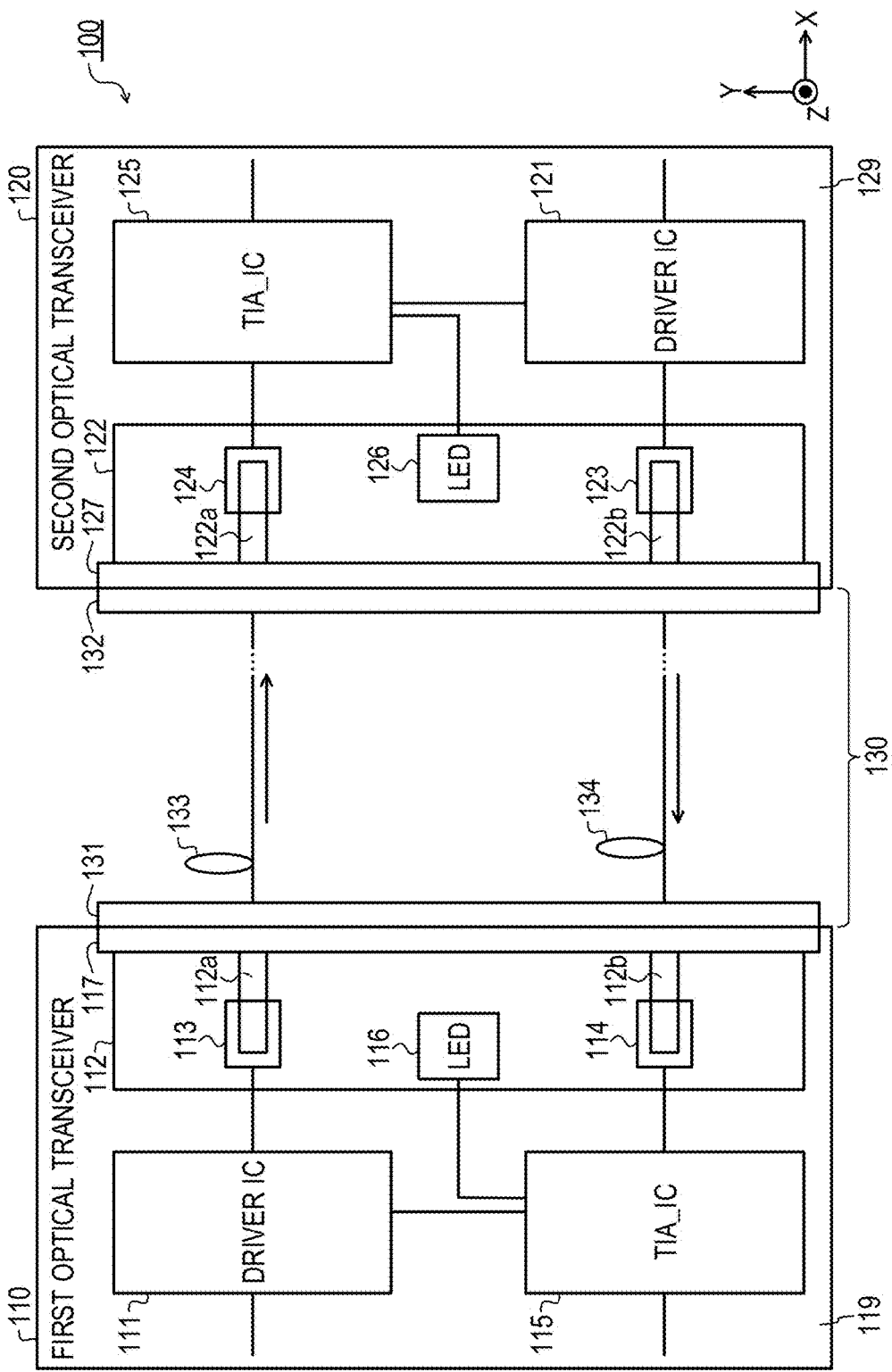
FIG. 1 is a diagram illustrating an example of an optical transmission system according to First Embodiment.

FIG. 1 is a diagram illustrating an example of an optical transmission system according to First Embodiment. As illustrated in FIG. 1, an optical transmission system 100 according to First Embodiment includes a first optical transceiver 110, a second optical transceiver 120, and a fiber cable 130. An X-axis, a Y-axis, and a Z-axis indicate directions which are orthogonal to one another. The X-axis represents a traveling direction of light. The Y-axis represents a direction parallel to the surfaces of bases (bases 119 and 129 which are to be described below) of the first optical transceiver 110 and the second optical transceiver 120. The Z-axis represents a direction orthogonal to the surfaces of the bases of the first optical transceiver 110 and the second optical transceiver 120.

The first optical transceiver 110 is an optical transceiver including a driver IC 111, a waveguide 112, a VCSEL 113, a PD 114, a TIA_IC 115, an LED 116, and an optical connector 117. The configuration of the first optical transceiver 110 is provided on the base 119. The base 119 may be implemented by, for example, an FPC or a PCB. The FPC is an abbreviation of a flexible printed circuit. The PCB is an abbreviation of a printed circuit board. The driver IC 111 is connected with the VCSEL 113 and the TIA_IC 115 via the wires of the base 119. The TIA_IC 115 is connected with the driver IC 111, the PD 114, and the LED 116 via the wires of the base 119.

The IC is an abbreviation of an integrated circuit. The VCSEL is an abbreviation of a vertical cavity surface emitting laser. The PD is an abbreviation of a photo detector. The TIA is an abbreviation of a transimpedance amplifier. The LED is an abbreviation of a light emitting diode.

The driver IC 111 generates a driving signal of the VCSEL 113 according to an input electric signal and outputs the generated driving signal to the VCSEL 113 to drive the VCSEL 113. Further, when an LOS signal indicating a detection of an optical input interruption is output from the TIA_IC 115, the driver IC 111 stops the light emission of the VCSEL 113. The LOS is an abbreviation of a loss of signal (input interruption).

For example, the driver IC 111 stops the light emission of the VCSEL 113 by outputting a light emission stop signal instructing the VCSEL 113 to stop the light emission. Alternatively, the driver IC 111 may stop the light emission of the VCSEL 113 by stopping an output of the driving signal to the VCSEL 113.

The VCSEL 113 is a laser light source which generates an optical signal (laser light) according to the driving signal output from the driver IC 111 and emits the generated optical signal to a core 112a of the waveguide 112. Further, when the light emission stop signal is output from the driver IC 111, the VCSEL 113 may stop the emission (light emission) of the optical signal.

The waveguide 112 is a waveguide (WG) which guides light. The waveguide 112 includes cores 112a and 112b. The core 112a propagates the optical signal emitted from the VCSEL 113 to emit the propagated optical signal to a fiber 113 of the fiber cable 130. The core 112b propagates an optical signal emitted from a fiber 134 of the fiber cable 130 to emit the propagated optical signal to the PD 114.

The PD 114 is a light receiving unit which receives (photoelectrically converts) the optical signal emitted from the core 112b of the waveguide 112. Further, the PD 114 generates an electric signal according to a result of the light reception and outputs the generated electric signal to the TIA_IC 115.

The TIA_IC 115 performs a reception processing of the electric signal output from the PD 114, and outputs the electric signal obtained by the reception processing. Further, the TIA_IC 115 detects an optical input interruption (LOS) in which an input of the optical signal to the PD 114 is interrupted. When the optical input interruption is detected, the TIA_IC 115 outputs an LOS signal indicating the detection of the optical input interruption to the driver IC 111, and outputs a light emission initiating signal instructing the initiation of the light emission to the LED 116. That is, the TIA_IC 115 is a control circuit which stops the transmission of the optical signal from the VCSEL 113 and allows the LED 116 to emit visible light when it is detected that the PD 114 does not receive the optical signal.

The LED 116 is turned off until the light emission initiating signal is output from the TIA_IC 115. Further, the LED 116 is a visible light source which emits visible light toward the side of the waveguide 112 (a positive direction of the Z-axis) when the light emission initiating signal is output from the TIA_IC 115. Further, the visible light emitted by the LED 116 is, for example, diffused light having a larger radiation angle than that of the optical signal emitted by the VCSEL 113 (laser light). Further, the LED 116 is disposed between the core 112a and the core 112b with intervals in the Z-axis direction.

For example, in the example illustrated in FIG. 1, the LED 116 is provided at a different position from those of the cores 112a and 112b on an XY plane, but the visible light emitted by the LED 116 is the diffused light, so that the visible light is coupled to the cores 112a and 112b. Accordingly, the visible light emitted by the LED 116 is propagated to the side of the second optical transceiver 120 by the fibers 133 and 134 of the fiber cable 130.

The optical connector 117 is, for example, an optical connector which is fixed to the base 119 and the waveguide 112, and is detachable from an optical connector 131 of the fiber cable 130.

The second optical transceiver 120 is an optical transceiver including a driver IC 121, a waveguide 122, a VCSEL 123, a PD 124, a TIA_IC 125, an LED 126, and an optical connector 127. Such configurations of the second optical transceiver 120 are provided on the base 129. The base 129 may be implemented by, for example, an FPC or a PCB. The driver IC 121 is connected with the VCSEL 123 and the TIA_IC 125 via the wires of the base 129. The TIA_IC 125 is connected with the driver IC 121, the PD 124, and the LED 126 via the wires of the base 129.

Each configuration of the second optical transceiver 120 is similar each corresponding configuration of the first optical transceiver 110. However, a core 122b of the waveguide 122 propagates an optical signal emitted from the VCSEL 123 and emits the optical signal to a fiber 134 of the fiber cable 130 in the second optical transceiver 120. Further, a core 122a of the waveguide 122 propagates an optical signal emitted from a fiber 133 of the fiber cable 130 and emits the optical signal to the PD 124 in the second optical transceiver 120.

The fiber cable 130 is a two-core optical transmission member including the optical connectors 131 and 132 and the fibers 133 and 134. The optical connector 131 is an optical connector which is fixed to an end portion of each of the fibers 133 and 134 at the side of the first optical transceiver 110 and is detachable from the optical connector 117 of the first optical transceiver 110. The optical connector 132 is an optical connector which is fixed to an end portion of each of the fibers 133 and 134 at the side of the second optical transceiver 120 and is detachable from the optical connector 127 of the second optical transceiver 120.

As an example, the optical connector 131 and the optical connector 117 are MPO connectors. Further, the optical connector 132 and the optical connector 127 are MPO connectors. FIG. 1 illustrates a state where the optical connector 131 is connected to the optical connector 117, and the optical connector 132 is connected to the optical connector 127.

The fibers 133 and 134 are optical fibers such as, for example, MMFs. The MMF is an abbreviation of a multi-mode fiber. The fiber 133 propagates the light emitted from the core 122b of the first optical transceiver 110 and emits the light to the core 122a of the second optical transceiver 120. The fiber 134 propagates the light emitted from the core 122a of the second optical transceiver 120 and emits the light to the core 112b of the first optical transceiver 110.

(TIA_IC of the Optical Transmission System According to First Embodiment)

Figure 2:
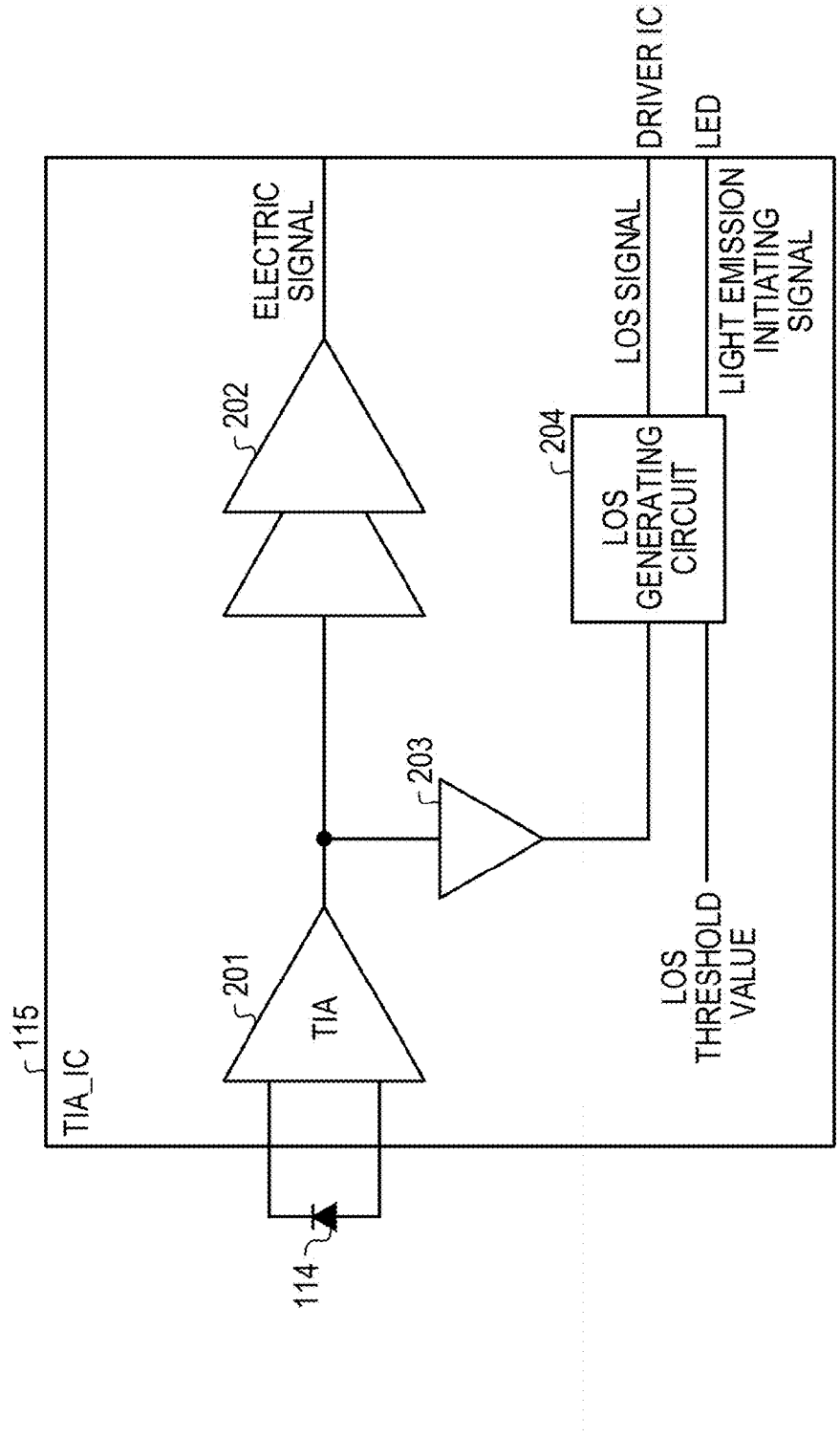
FIG. 2 is a diagram illustrating an example of TIA_IC of the optical transmission system according to First Embodiment.

FIG. 2 is a diagram illustrating an example of the TIA_IC of the optical transmission system according to First Embodiment. In FIG. 2, the configuration of the TIA_IC 115 of the first optical transceiver 110 is described, but the configuration of the TIA_IC 125 of the second optical transceiver 120 is similar to the configuration of the TIA_IC 115. As illustrated in FIG. 2, the TIA_IC 115 includes, for example, a TIA 201, amplifiers 202 and 203, and an LOS generating circuit 204.

The TIA 201 converts an electric signal output from the PD 114 from a current signal to a voltage signal. Then, the TIA 201 outputs the converted electric signal to the amplifiers 202 and 203. The amplifier 202 amplifies the electric signal output from the TIA 201, and outputs the amplified electric signal to a subsequent stage of the TIA_IC 115. The amplifier 203 amplifies the electric signal output from the TIA 201 and outputs the amplified electric signal (PD current) to the LOS generating circuit 204.

The LOS generating circuit 204 detects an optical input interruption (LOS) in which an input of an optical signal to the PD 114 is interrupted based on the electric signal output from the amplifier 203 (PD current). For example, an LOS threshold value indicating a predetermined voltage value is set in the LOS generating circuit 204, and the LOS generating circuit 204 detects the optical input interruption based on the comparison between the voltage of the electric signal output from the amplifier 203 and the LOS threshold value. As an example, when the voltage of the electric signal output from the amplifier 203 is lower than the LOS threshold value, the LOS generating circuit 204 determines that an optical input interruption is generated.

When the optical input interruption is detected, the LOS generating circuit 204 outputs an LOS signal indicating the detection of the optical input interruption to the driver IC 111. Further, for example, when the LOS generating circuit 204 outputs the LOS signal to the driver IC 111, the LOS generating circuit 204 outputs a light emission initiating signal instructing the initiation of the light emission to the LED 116.

(Detection of Optical Input Interruption by the LOS Generating Circuit According to First Embodiment)

Figure 3:
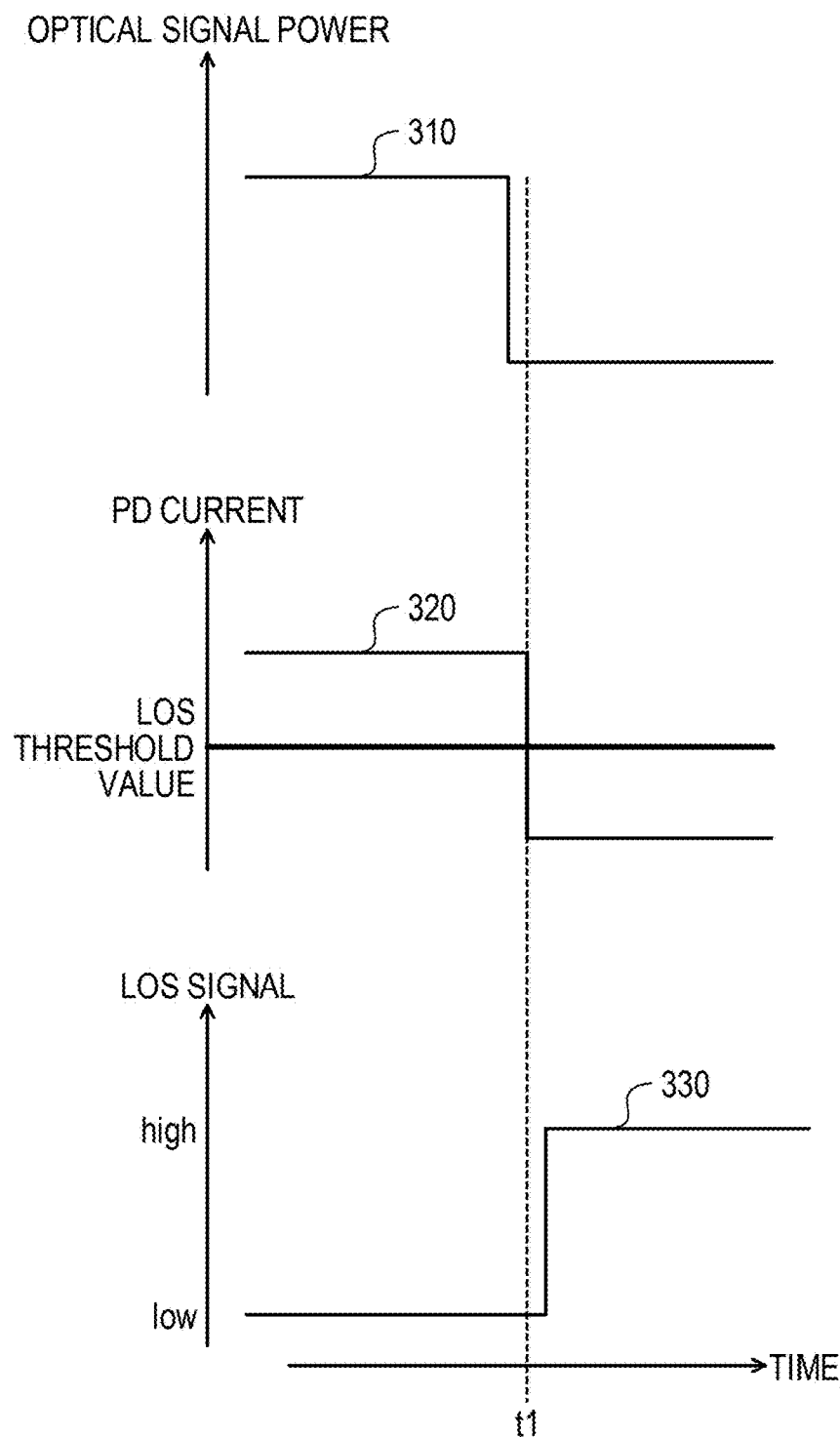
FIG. 3 is a diagram illustrating an example of a detection of an optical input interruption by an LOS generating circuit according to First Embodiment.

FIG. 3 is a diagram illustrating an example of a detection of an optical input interruption by the LOS generating circuit according to First Embodiment. Descriptions will be made on the detection of the optical input interruption by the LOS generating circuit 204 of the TIA_IC 115 of the first optical transceiver 110 illustrated in FIG. 2, but the same applies to the detection of the optical input interruption in the TIA_IC 125 of the second optical transceiver 120.

In FIG. 3, the horizontal axis represents time. Optical signal power 310 indicates power (intensity) of the optical signal input to the PD 114. A PD current 320 indicates a voltage of the electric signal input to the LOS generating circuit 204 (PD current) illustrated in FIG. 2. An LOS signal 330 indicates an LOS signal output by the LOS generating circuit 204.

In the example illustrated in FIG. 3, it is assumed that an input interruption in which the input of the optical signal to the PD 114 is interrupted is generated, so that the optical signal power 310 is sharply decreased, and accordingly, the PD current 320 is also sharply decreased, and the PD current 320 becomes lower than the LOS threshold value at time t1. In this case, the LOS signal 330 is changed from a low level state to a high level state, and is output to the driver IC 111 as the LOS signal indicating the detection of an input interruption. Further, the LOS generating circuit 204 sets the LOS signal 330 to a high level and outputs the light emission initiating signal instructing the initiation of the light emission to the LED 116.

An intensity of the visible light emitted by the LEDs 116 and 126 may be set, for example, such that the PD current is equal to or lower than the LOS threshold value. Accordingly, when the light emission of the VCSELs 113 and 123 is stopped and the light emission of the LEDs 116 and 126 are initiated, a failure of the detection of the input interruption by the visible light of the LEDs 116 and 126 may be avoided.

(Irradiation of Visible Light by the LED of the Optical Transmission System (YZ Plane) According to First Embodiment)

Figure 4:
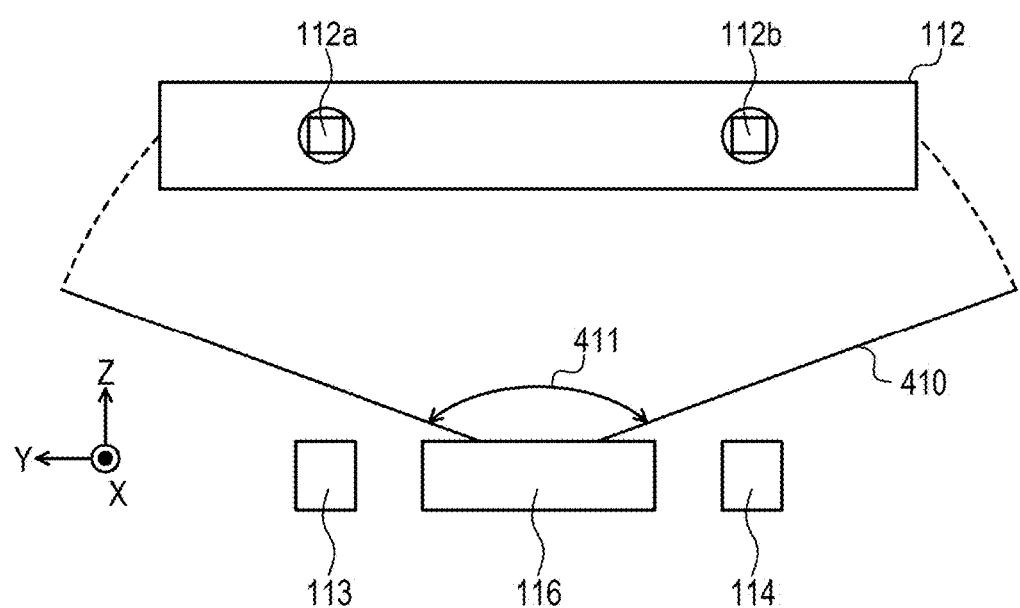
FIG. 4 is a diagram illustrating an example of irradiation of visible light by an LED (YZ plane) of the optical transmission system according to First Embodiment.

FIG. 4 is a cross-sectional view illustrating an example of irradiation of visible light by the LED of the optical transmission system (YZ plane) according to First Embodiment. In FIG. 4, the same parts as those illustrated in FIG. 1 are indicated with the same reference numerals, and descriptions thereof will be omitted. FIG. 4 illustrates cross-sections of the waveguide 112, the VCSEL 113, the PD 114, and the LED 116 illustrated in FIG. 1 which have been cut along the YZ plane. Further, in the example illustrated in FIG. 4, the optical input interruption is detected in the optical transmission system 100, so that the light emission by the VCSEL 113 is stopped and the LED 116 emits light.

Visible light 410 is visible light emitted from the LED 116 provided at a lower portion of the waveguide 112. As illustrated in FIG. 4, the visible light 410 is diffused light diffused on the YZ plane. A radiation angle 411 is a radiation angle of the visible light 410. For example, the radiation angle 411 of the visible light 410 is larger than that of the optical signal emitted by the VCSEL 113 to the core 112a (laser light).

Accordingly, for example, even though the LED 116 is not precisely positioned on the XY plane, the visible light 410 from the LED 116 may be incident to the core 112a or the core 112b. Descriptions have been made on the irradiation of the visible light by the LED 116 of the first optical transceiver 110, but the same applies to the irradiation of the visible light by the LED 126 of the second optical transceiver 120.

(Irradiation of Visible Light by the LED of the Optical Transmission System (XZ Plane) According to First Embodiment)

Figure 5:
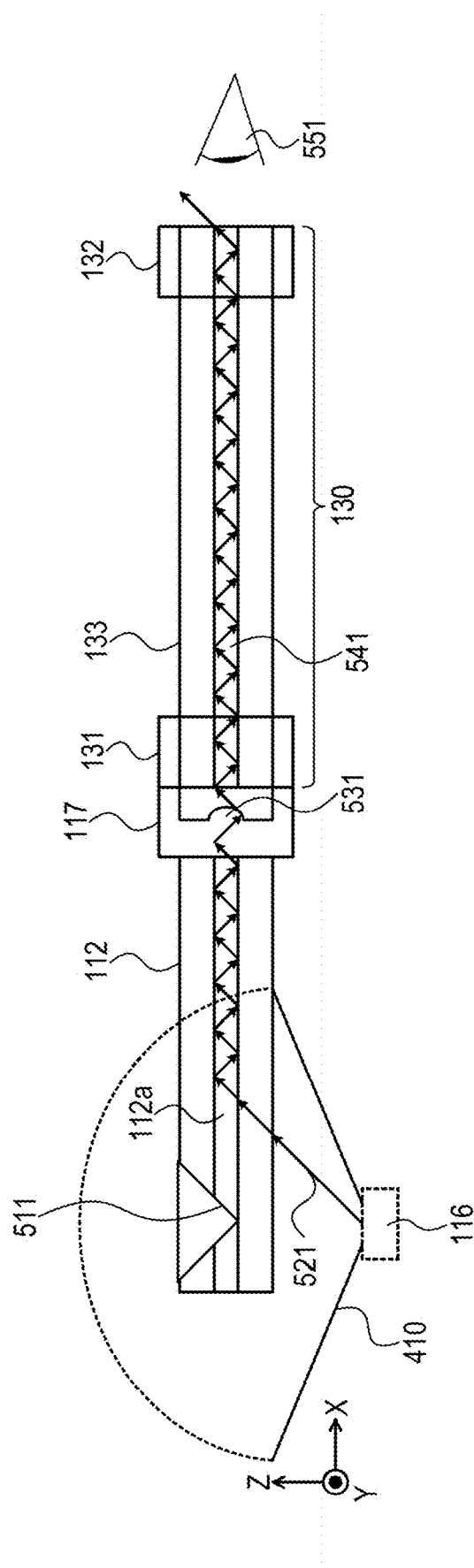
FIG. 5 is a cross-sectional view illustrating an example of irradiation of visible light by the LED (XZ plane) of the optical transmission system according to First Embodiment.

FIG. 5 is a cross-sectional view illustrating an example of irradiation of visible light by the LED of the optical transmission system (XZ plane) according to First Embodiment. In FIG. 5, the same parts as those illustrated in FIGS. 1 and 4 are indicated with the same reference numerals, and descriptions thereof will be omitted. FIG. 5 illustrates cross-sections of the core 112a and the fiber cable 130 of the waveguide 112 illustrated in FIG. 1 which have been cut along the XZ plane.

In the example illustrated in FIG. 5, an optical input interruption is detected in the optical transmission system 100, so that the light emission by the VCSEL 113 is stopped and the LED 116 emits the visible light 410, and the optical connector 132 is taken off from the optical transceiver 120 by an operator.

A mirror 511 is a reflecting part provided in the waveguide 112. For example, the mirror 511 reflects the optical signal which is emitted from the VCSEL 113 provided at the lower portion of the core 112a of the waveguide 112 in a positive direction of the Z-axis, in a positive direction of the X-axis to allow the optical signal to be incident to the core 112a.

The visible light 410 emitted by the LED 116 is diffused light diffused on the XZ plane. Accordingly, the visible light 410 includes respective light having different incident angles to the core 112a. For example, visible light 521 included in the visible light 410 is light of which the incident angle to the core 112a is equal to or smaller than a threshold angle, and when the visible light 521 is incident to the core 112a, the visible light 521 is totally reflected inside the core 112a and is propagated by the core 112a.

A lens unit 531 is a lens provided inside the optical connector 117. A core 541 is a core of the fiber 133 of the fiber cable 130. The visible light 521 propagated by the core 112a is collected and incident to the core 541 by the lens unit 531, and when the fiber cable 130 is normal, the visible light 521 is propagated by the core 541 and emitted from an end portion of the optical connector 132. Accordingly, the visible light 521 of the LED 116 may be confirmed by eyes 551 of the operator.

In the meantime, when the fiber cable 130 has an abnormality, such as a disconnection, the visible light 521 of the LED 116 does not normally reach up to the eyes 521 of the operator. In this case, at the end portion of the optical connector 132, the visible light 521 may not be visually recognized or unnatural scattering light is visually recognized.

(Processing When an Abnormality is Generated in the Optical Transmission System According to First Embodiment)

Figure 6:
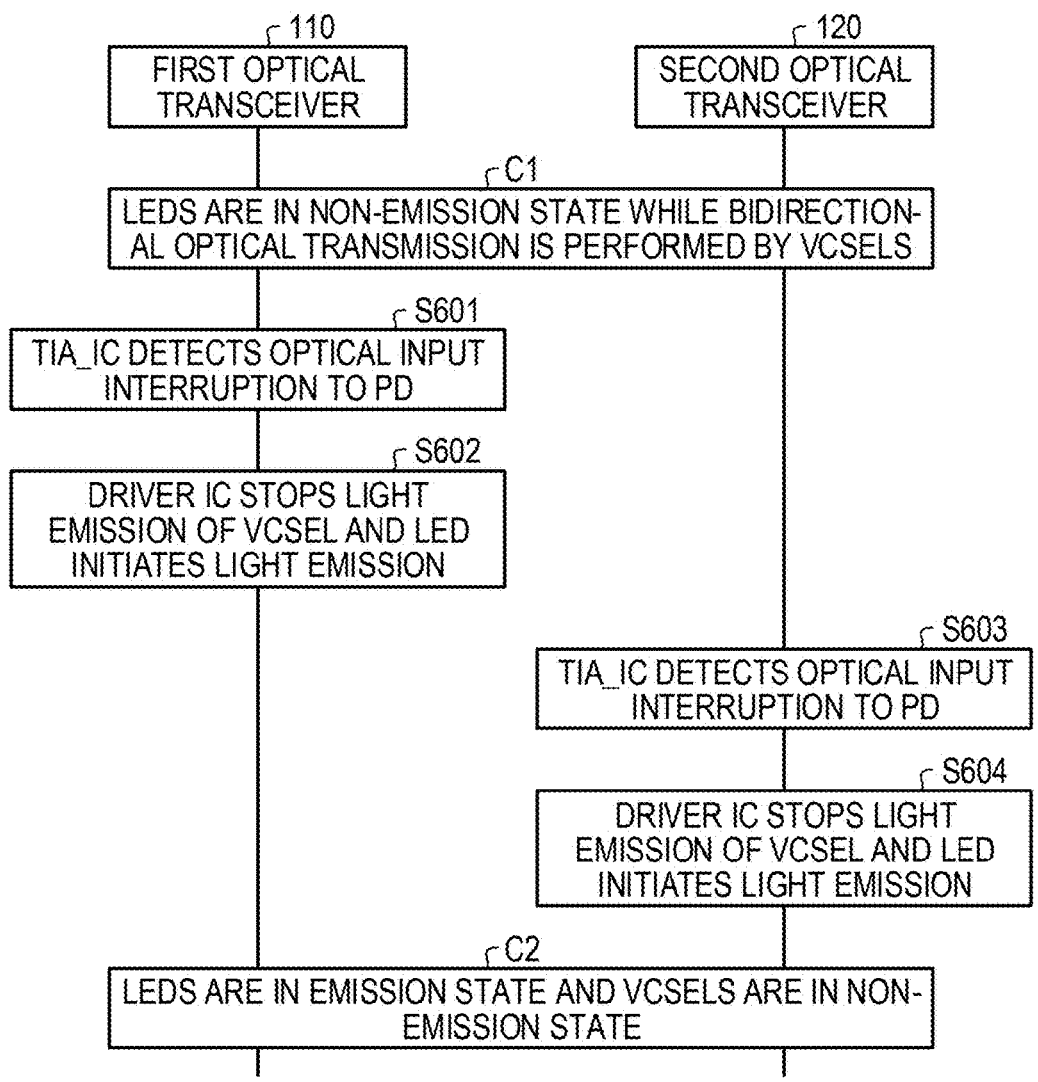
FIG. 6 is a sequence diagram illustrating an example of processing when an abnormality is generated in the optical transmission system according to First Embodiment.

FIG. 6 is a sequence diagram illustrating an example of processing when an abnormality is generated in the optical transmission system according to First Embodiment. In the optical transmission system 100 according to First Embodiment, when an abnormality is generated, for example, each operation described below is executed.

First, as indicated in state Cl, it is assumed that a bidirectional optical communication is performed by the VCSELs 113 and 123 between the first optical transceiver 110 and the second optical transceiver 120. In state C1, the LEDs 116 and 126 of the first optical transceiver 110 and the second optical transceiver 120 are in a non-emission state.

Next, it is assumed that due to a specific abnormality, the TIA_IC 115 of the first optical transceiver 110 detects an optical input interruption to the PD 114 (operation S601). In this case, for example, the TIA_IC 115 outputs an LOS signal indicating the detection of the optical input interruption to the driver IC 111, and outputs a light emission initiating signal instructing the initiation of the light emission to the LED 116.

Next, the driver IC 111 of the first optical transceiver 110 stops the light emission of the VCSEL 113, and the LED 116 initiates the light emission (operation S602). For example, when the LOS signal is output from the TIA_IC 115, the driver IC 111 stops the light emission of the VCSEL 113 by outputting a light emission stop signal instructing the VCSEL 113 to stop the light emission. When the light emission initiating signal is output from the TIA_IC 115, the LED 116 initiates the light emission.

Next, the TIA_IC 125 of the second optical transceiver 120 detects an optical input interruption to the PD 124 according to the stop of the light emission of the VCSEL 113 of the first optical transceiver 110 in operation S602 (operation S603). In this case, for example, the TIA_IC 115 outputs the LOS signal indicating the detection of the optical input interruption to the driver IC 121, and outputs the light emission initiating signal instructing the initiation of the light emission to the LED 126.

Next, the driver IC 121 of the second optical transceiver 120 stops the light emission of the VCSEL 123, and the LED 126 initiates the light emission (operation S604). For example, when the LOS signal is output from the TIA_IC 125, the driver IC 121 stops the light emission of the VCSEL 123 by outputting the light emission stop signal instructing the VSCEL 123 to stop the light emission. When the light emission initiating signal is output from the TIA_IC 125, the LED 116 initiates the light emission.

Accordingly, as indicated in state C2, the LEDs 116 and 126 of the first optical transceiver 110 and the second optical transceiver 120 are in an emission state. In state C2, the VCSELs 113 and 123 of the first optical transceiver 110 and the second optical transceiver 120 do not emit light. In state C2, for example, at least one of the first optical transceiver 110 and the second transceiver 120 may be configured to notify a maintainer (operator) of the optical transmission system 100 of the generation of the abnormality.

The configuration in which the driver IC 111 outputs the light emission stop signal to the VCSEL 113 to stop the light emission of the VCSEL 113 has been described, but the configuration in which the driver IC 111 stops the light emission of the VCSEL 113 is not limited thereto. For example, the driver IC 111 may also stop the light emission of the VCSEL 113 by stopping an input of a driving signal to the VCSEL 113. The same applies to the configuration in which the driver IC 121 stops the light emission of the VCSEL 123.

The configuration in which the TIA_IC 115 outputs the light emission initiating signal to the LED 116 has been described, but the configuration of initiating the light emission of the LED 116 is not limited thereto. For example, the driver IC 111 or another circuit of the first optical transceiver 110 may be configured to output the light emission initiating signal to the LED 116 when the LOS signal is output from the TIA_IC 115. Alternatively, the LED 116 may be configured to initiate the light emission when the LOS signal is output from the TIA_IC 115, that is, the TIA_IC 115 may be configured to output the LOS signal, as the light emission initiating signal, to the LED 116. The same applies to the configuration in which the light emission of the LED 126 is initiated.

(Operation of Determining a Cause of an Abnormality by an Operator of the Optical Transmission System According to First Embodiment)

Figure 7:
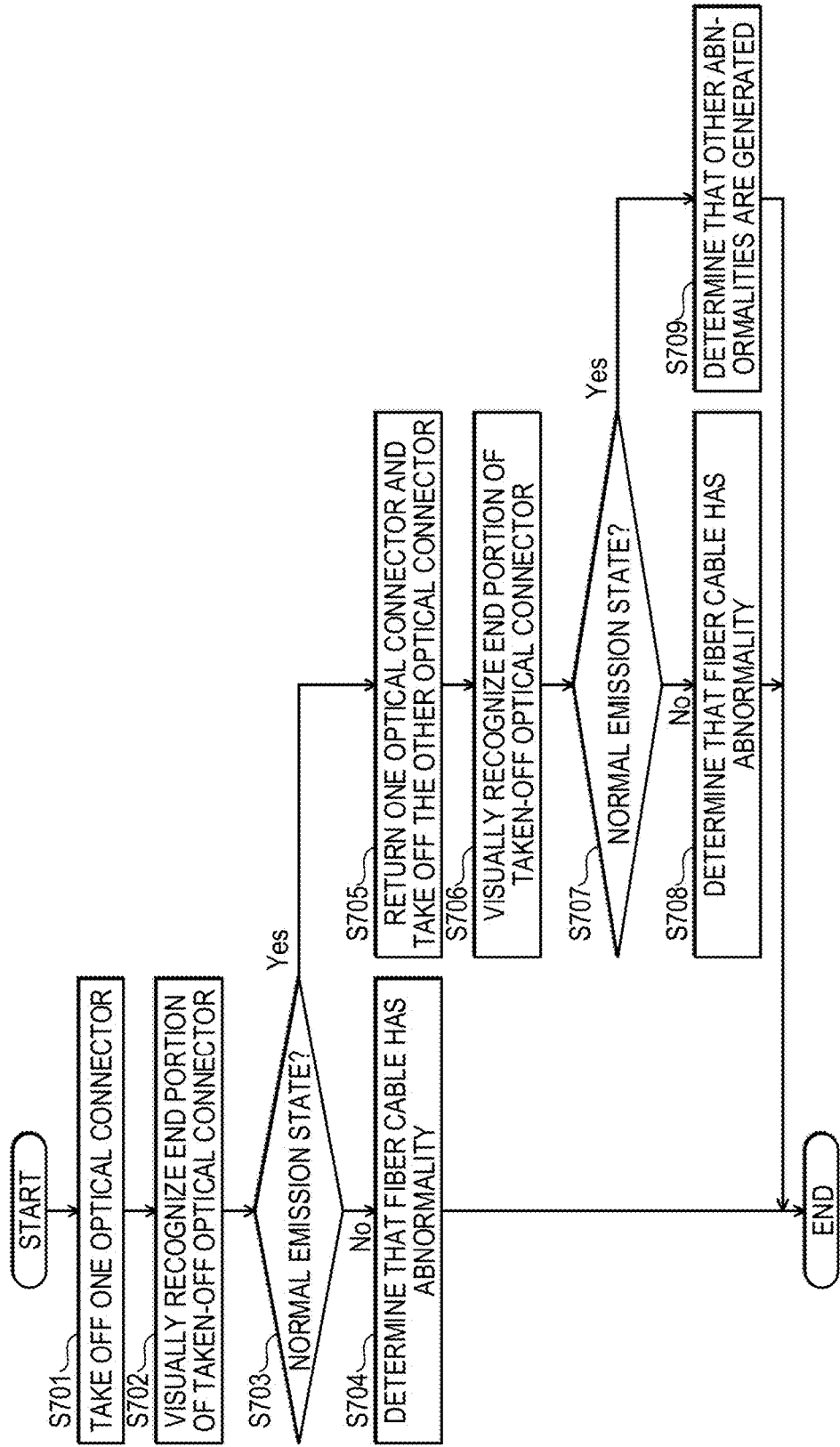
FIG. 7 is a flowchart illustrating an example of an operation of determining a cause of an abnormality by an operator of the optical transmission system according to First Embodiment.

FIG. 7 is a flowchart illustrating an example of an operation of determining a reason of an abnormality by an operator of the optical transmission system according to First Embodiment. For example, when the optical transmission system 100 is in state C2 illustrated in FIG. 6, a maintainer (operator) of the optical transmission system 100 determines the cause of an abnormality through each operation illustrated in FIG. 7.

First, the operator takes off one optical connector between the optical connectors 131 and 132 of the fiber cable 130 (operation S701). For example, the operator takes off the optical connector 131 of the fiber cable 130 from the first optical transceiver 110. Alternatively, the operator takes off the optical connector 132 of the fiber cable 130 from the second optical transceiver 120.

Next, the operator visually identifies the end portion of the optical connector taken off in operation S701 (operation S702). Next, the operator determines whether the end portion of the optical connector taken off in operation S701 is in a normal emission state, based on a result of the visual identification in operation S702 (operation S703). For example, when the visible light of the LED is normally and visually recognized at the end portion of the taken-off optical connector, the operator determines that the end portion of the optical connector is in the normal emission state. Further, when the visible light of the LED is not visually recognized at the end portion of the taken-off optical connector, or unnatural scattering light is visually recognized at the end portion of the taken-off optical connector, the operator determines that the end portion of the optical connector is not in the normal emission state.

When the end portion of the optical connector is not in the normal emission state in operation S703 (operation S703: No), the operator determines that the fiber cable 130 has an abnormality (operation S704) and terminates a series of determining processing. In this case, the abnormality of the fiber cable 130 includes, for example, a defect of a fiber of the fiber cable 130, a connection defect of the optical connector, which is different from the optical connector taken off in operation S701 between the optical connectors 131 and 132 of the fiber cable 130, and the like. In this case, for example, the operator restores the optical transmission system 100 by taking an appropriate action, such as replacing the fiber cable 130.

When the end portion of the optical connector is in the normal emission state in operation S703 (operation S703: Yes), the operator returns the one optical connector taken off in operation S701 into an original state and takes off the other optical connector of the fiber cable 130 (operation S705). For example, when the optical connector 131 is taken off in operation S701, the operator connects the optical connector 131 to the first optical transceiver 110 and takes off the optical connector 132 from the second optical transceiver 120 in operation S705. Further, when the optical connector 132 is taken off in operation S701, the operator connects the optical connector 132 to the second optical transceiver 120 and takes off the optical connector 131 from the first optical transceiver 110 in operation S705.

Next, the operator visually identifies an end portion of the optical connector taken off in operation S705 (operation S706). Next, the operator determines whether the end portion of the optical connector taken off in operation S705 is in the normal emission state, based on a result of the visual identification in operation S706 (operation S707).

When the end portion of the optical connector is not in the normal emission state in operation S707 (operation S707: No), the operator determines that the fiber cable 130 has an abnormality (operation S708) and terminates the series of determining process. In this case, the abnormality of the fiber cable 130 includes, for example, a connection defect of the optical connector, which is different from the optical connector taken off in operation S705 between the optical connectors 131 and 132 of the fiber cable 130, and the like. In this case, for example, the operator restores the optical transmission system 100 by taking an appropriate action, such as replacing the fiber cable 130.

When the end portion of the optical connector is in the normal emission state in operation S707 (operation S707: Yes), the operator determines that the other abnormalities different from the abnormality of the fiber cable 130 are generated (operation S709) and terminates the series of determining process. In this case, the other abnormalities include, for example, a defect of the first optical transceiver 110 or the second optical transceiver 120, a defect of an upstream device or a transmission path which inputs an electric signal to be transmitted to the first optical transceiver 110 to the second optical transceiver 120, and the like.

By each operation illustrated in FIG. 7, the operator may determine whether the cause of the abnormality is in the fiber cable 130 by removing and visually identifying the optical connectors 131 and 132 when the abnormality of the optical transmission system 100 is generated. Accordingly, when the cause of the abnormality is in the fiber cable 130, the operator may rapidly restore the optical transmission system 100 by, for example, replacing the fiber cable 130. Further, in this case, the light emission of the VCSELs 113 and 123 is stopped, thereby protecting the eyes of the operator.

(Another Example of the Optical Transmission System According to First Embodiment)

Figure 8:
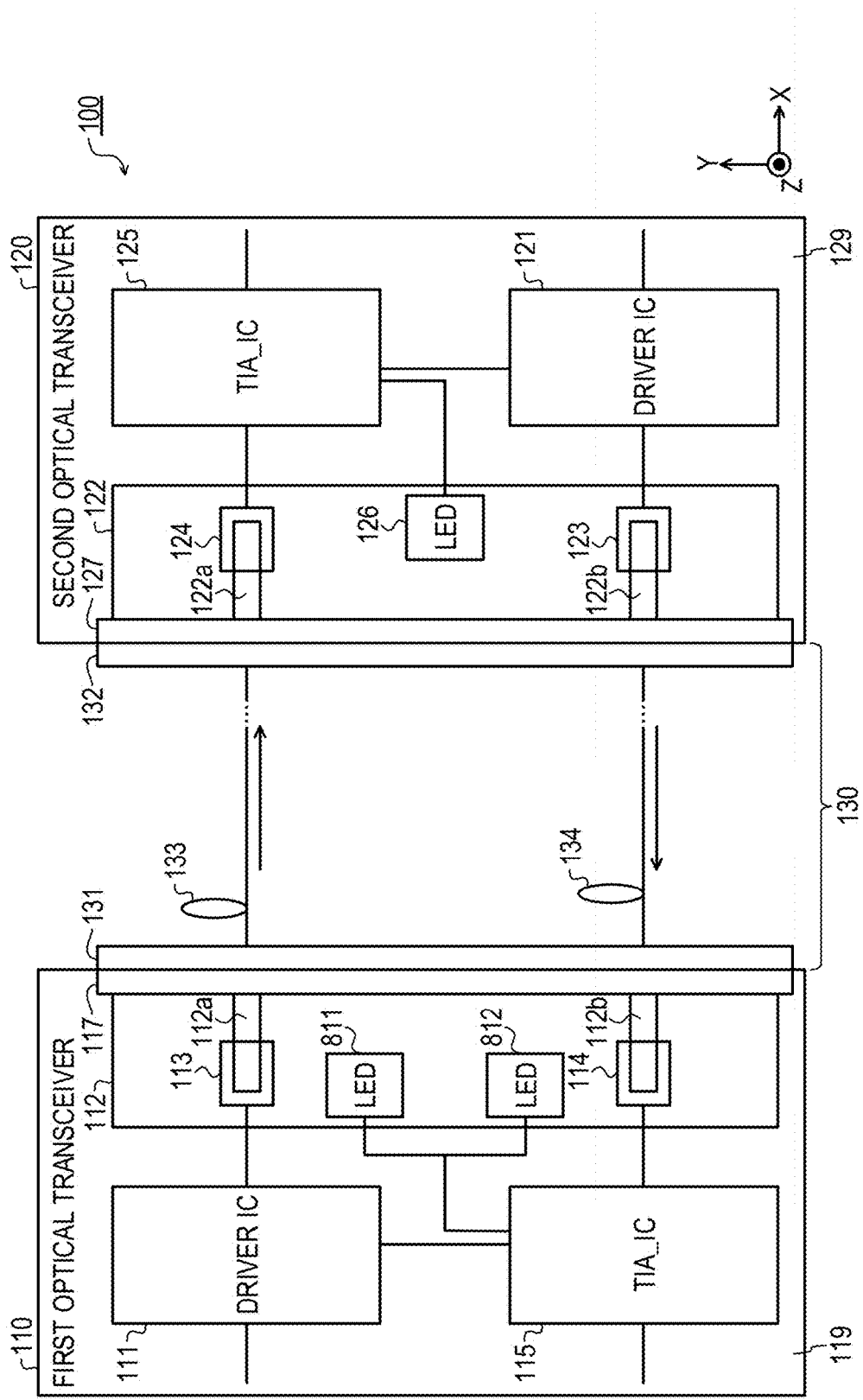
FIG. 8 is a diagram illustrating another example of the optical transmission system according to First Embodiment.

FIG. 8 is a diagram illustrating another example of the optical transmission system according to First Embodiment. In FIG. 8, the same parts as those illustrated in FIG. 1 are indicated with the same reference numerals, and descriptions thereof will be omitted. As illustrated in FIG. 8, the first optical transceiver 110 may include LEDs 811 and 812 instead of the LED 116 illustrated in FIG. 1.

Each of the LEDs 811 and 812 is the same LED as the LED 116 illustrated in FIG. 1. However, the LED 811 may be provided in the vicinity of the VCSEL 113 on the XY plane, and the LED 812 may be provided in the vicinity of the PD 114 on the XY plane.

As illustrated in FIG. 8, there may be provided a plurality of LEDs which initiates the light emission when the input interruption of the PD 114 is detected. Further, the location of the LED which initiates the light emission when the input interruption of the PD 114 is detected is not limited to the location illustrated in each of FIGS. 1 and 8, and the location of the LED is not particularly limited as long as the visible light emitted by the LED is incident to at least one of the cores 112a and 112b. Descriptions have been made on the LED provided in the first optical transceiver 110, but the same description is applied to the LED provided in the second optical transceiver 120.

As described above, according to the first optical transceiver 110 according to First Embodiment, when it is detected that the PD 114 does not receive the optical signal, the first optical transceiver 110 may stop the transmission of the optical signal from the VCSEL 113 and allow the LED 116 to emit the visible light. Accordingly, since the laser light is not incident to the fibers 133 and 134, but the visible light is incident to the fibers 133 and 134, the operator may confirm whether the light reaches up to the end portion of the fiber while protecting the eyes of the operator from the laser light.

Accordingly, for example, when the optical input interruption of the PD 114 is generated by a specific abnormality, it is possible to safely and easily confirm whether the cause of the abnormality is in the fiber cable 130, thereby efficiently conducting a maintenance operation.

The visible light emitted from the LED 116 is diffused light, so that the location or the angle of the LED 116 for allowing the visible light of the LED 116 to be incident to the fibers 133 and 134 becomes broad. Accordingly, for example, even though the preciseness for positioning the LED 116 is low, the visible light may be incident to the fibers 133 and 134 and manufacturing costs of the first optical transceiver 110 may be reduced. Further, the degree of freedom of the design of the first optical transceiver 110 including the LED 116 may be improved.

The LED 116 is provided so that the visible light is incident to both of the fibers 133 and 134, so that, for example, when the fiber 133 is normal and the fiber 134 has the abnormality, it is possible to readily specify that the fiber 134 is the element in which the abnormality is generated. For example, when the fiber 133 is normal and the fiber 134 has the abnormality, the normal visible light may be visually recognized at the end portion of the fiber 133 at the side of the second optical transceiver 120 and the normal visible light cannot be visually recognized at the end portion of the fiber 134 at the side of the second optical transceiver 120. In this case, the operator may specify that the fiber 134 is the element in which the abnormality is generated.

The LED 116 is provided between the VCSEL 113 and the PD 114, so that the LED 116 may be provided while suppressing the first optical transceiver 110 from having a large size. Further, it becomes easy to provide the LED 116 so that the visible light of the LED 116 is incident to both of the fibers 133 and 134.

The second optical transceiver 120 may have the same configuration as that of the first optical transceiver 110. Accordingly, it is possible to more accurately determine the element in which the abnormality is generated. For example, when a contact failure of the optical connector 131 at the side of the first optical transceiver 110 between the optical connectors 131 and 132 of the fiber cable 130 is generated, it is possible to specify that the contact failure is generated in the optical connector 131 of the fiber cable 130. However, the configuration in which the LED 126 is not provided in the second optical transceiver 120 is also provided.

Second Embodiment

In relation to Second Embodiment, the different parts from those of First Embodiment will be described. In First Embodiment, the configuration in which the optical transmission is performed by using the two-core fiber cable 130 has been described, but in Second Embodiment, the configuration in which the optical transmission is performed by using the 12-core fiber cable 130 will be described.

(Optical Transmission System According to Second Embodiment)

Figure 9:
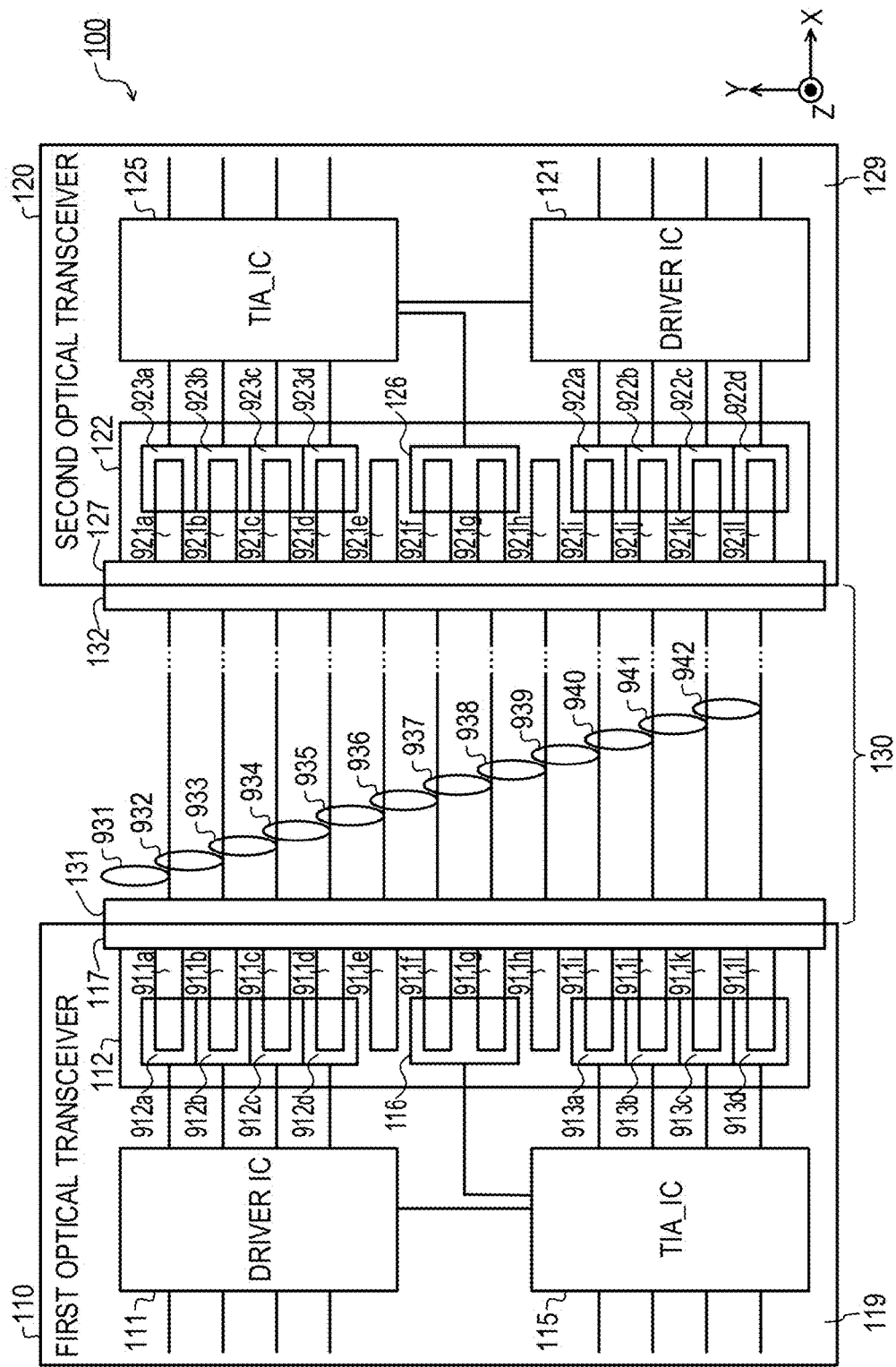
FIG. 9 is a diagram illustrating an example of an optical transmission system according to Second Embodiment.

FIG. 9 is a diagram illustrating an example of an optical transmission system according to Second Embodiment. In FIG. 9, the same parts as those illustrated in FIG. 1 are indicated with the same reference numerals, and description thereof will be omitted. As illustrated in FIG. 9, a fiber cable 130 according to Second Embodiment is a 12-core optical transmission member including fibers 931 to 942, instead of the fibers 133 and 134 illustrated in FIG. 1. The fibers 931 to 942 are, for example, optical fibers, such as an MMF, which are the same as the fibers 133 and 134 illustrated in FIG. 1.

In the optical transmission system 100 according to Second Embodiment, an optical communication of four channels is performed from a first optical transceiver 110 to a second optical transceiver 120 by using the fibers 931 to 934 of the fiber cable 130. Further, the optical communication of the four channels is performed from the second optical transceiver 120 to the first optical transceiver 110 by using the fibers 939 to 942 of the fiber cable 130. Accordingly, the optical communication is not performed in the fibers 935 to 938 of the fiber cable 130.

The first optical transceiver 110 according to Second Embodiment includes, for example, VCSELs 912a to 912d and PDs 913a to 913d, instead of the VCSEL 113 and the PD 114 illustrated in FIG. 1. The VCSELs 912a to 912d are the same VCSELs as the VCSEL 113 illustrated in FIG. 1. The PDs 913a to 913d are the same PDs as the PD 114 illustrated in FIG. 1. Further, a waveguide 112 of the first optical transceiver 110 includes cores 911a to 911l, instead of the cores 112a and 112b illustrated in FIG. 1. The cores 911a to 911l are the same cores as the cores 112a and 112b illustrated in FIG. 1.

A driver IC 111 generates a driving signal of each of the VCSELs 912a to 912d according to input four-channel electric signals, and outputs the generated driving signals to the VCSELs 912a to 912d, respectively, thereby driving the VCSELs 912a to 912d. Further, when an LOS signal indicating a detection of an optical input interruption is output from a TIA_IC 115, the driver IC 111 stops light emission of the VCSELs 912a to 912d.

For example, the driver IC 111 stops the light emission of the VCSELs 912a to 912d by outputting a light emission stop signal instructing the VCSELs 912a to 912d to stop the light emission. Alternatively, the driver IC 111 may also stop the light emission of the VCSELs 912a to 912d by stopping an output of the driving signal to each of the VCSELs 912a to 912d.

The VCSELs 912a to 912d are laser light sources which generate optical signals (laser light) according to the driving signal output from the driver IC 111, and emit the generated optical signals to the cores 911a to 911d of the waveguide 112, respectively. Further, when the light emission stop signal is output from the driver IC 111, each of the VCSELs 912a to 912d may stop the emission of the optical signal (light emission).

The cores 911a to 911d propagate the optical signals emitted from the VCSELs 912a to 912d, respectively, and emit the propagated optical signals to the fibers 931 to 934 of the fiber cable 130, respectively. The cores 911i to 911l propagate the optical signals emitted from the fibers 939 to 942 of the fiber cable 130, respectively, and emit the propagated optical signals to the PDs 913a to 913d, respectively.

The PDs 913a to 913d are light receiving units which receive the optical signals (photoelectrically convert) emitted from the cores 911i to 911l of the waveguide 112, respectively. Further, each of the PDs 913a to 913d generates an electric signal according to a result of the light reception and outputs the generated electric signal to the TIA_IC 115.

The TIA_IC 115 performs a reception processing of the electric signal output from each of the PDs 913a to 913d, and outputs each of the electric signals of the four channels obtained by the reception processing. Further, the TIA_IC 115 detects an optical input interruption (LOS) in which an input of the optical signal of at least one of the PDs 913a to 913d is interrupted. Then, when the optical input interruption is detected, the TIA_IC 115 outputs an LOS signal indicating the detection of the optical input interruption to the driver IC 111, and outputs a light emission initiating signal instructing the initiation of the light emission to the LED 116.

The second optical transceiver 120 according to Second Embodiment includes, for example, VCSELs 922a to 922d and PDs 923a to 923d, instead of the VCSEL 123 and the PD 124 illustrated in FIG. 1. The VCSELs 922a to 922d are the same VCSELs as the VCSEL 123 illustrated in FIG. 1. The PDs 923a to 923d are the same PDs as the PD 124 illustrated in FIG. 1. Further, a waveguide 122 of the second optical transceiver 120 includes cores 921a to 921l, instead of the cores 122a and 122b illustrated in FIG. 1. The cores 921a to 921l are the same cores as the cores 122a and 122b illustrated in FIG. 1.

The configuration of the second optical transceiver 120 is the same as each configuration of the first optical transceiver 110. However, the cores 921i to 921l of the waveguide 122 propagate optical signals emitted from the VCSELs 922a to 922d, respectively, and emit the propagated optical signals to the fibers 939 to 942 of the fiber cable 130, respectively. Further, the cores 921a to 921d of the waveguide 122 propagate optical signals emitted from the fibers 931 to 934 of the fiber cable 130, and emit the propagated optical signals to the PDs 923a to 923d, respectively.

The fibers 931 to 934 of the fiber cable 130 propagate light emitted from the cores 911a to 911d of the first optical transceiver 110, and emit the propagated light to the cores 921a to 921d of the second optical transceiver 120, respectively. The fibers 939 to 942 propagate light emitted from the cores 921i to 921l of the second optical transceiver 120, and emit the propagated light to the cores 911i to 911l of the first optical transceiver 110, respectively.

In the example illustrated in FIG. 9, the LED 116 is provided at almost the same positions as those of the VCSELs 912a to 912d and the PDs 913a to 913d on the X-axis, and is provided between the VCSELs 912a to 912d and the PDs 913a to 913d on the Y-axis. However, the location or a size of the LED 116 is not limited to the example illustrated in FIG. 9. For example, the LED 116 may be configured so that the visible light of the LED 116 is incident to at least one of the cores 911a to 911l. Further, for example, as in the configuration illustrated in FIG. 8, the plurality of LEDs may also be provided for one optical transceiver. Descriptions have been made on the LED 116 of the first optical transceiver 110, but the same applies to the LED 126 of the second optical transceiver 120.

(Irradiation of Visible Light by the LED of the Optical Transmission System (YZ Plane) according to Second Embodiment)

Figure 10:
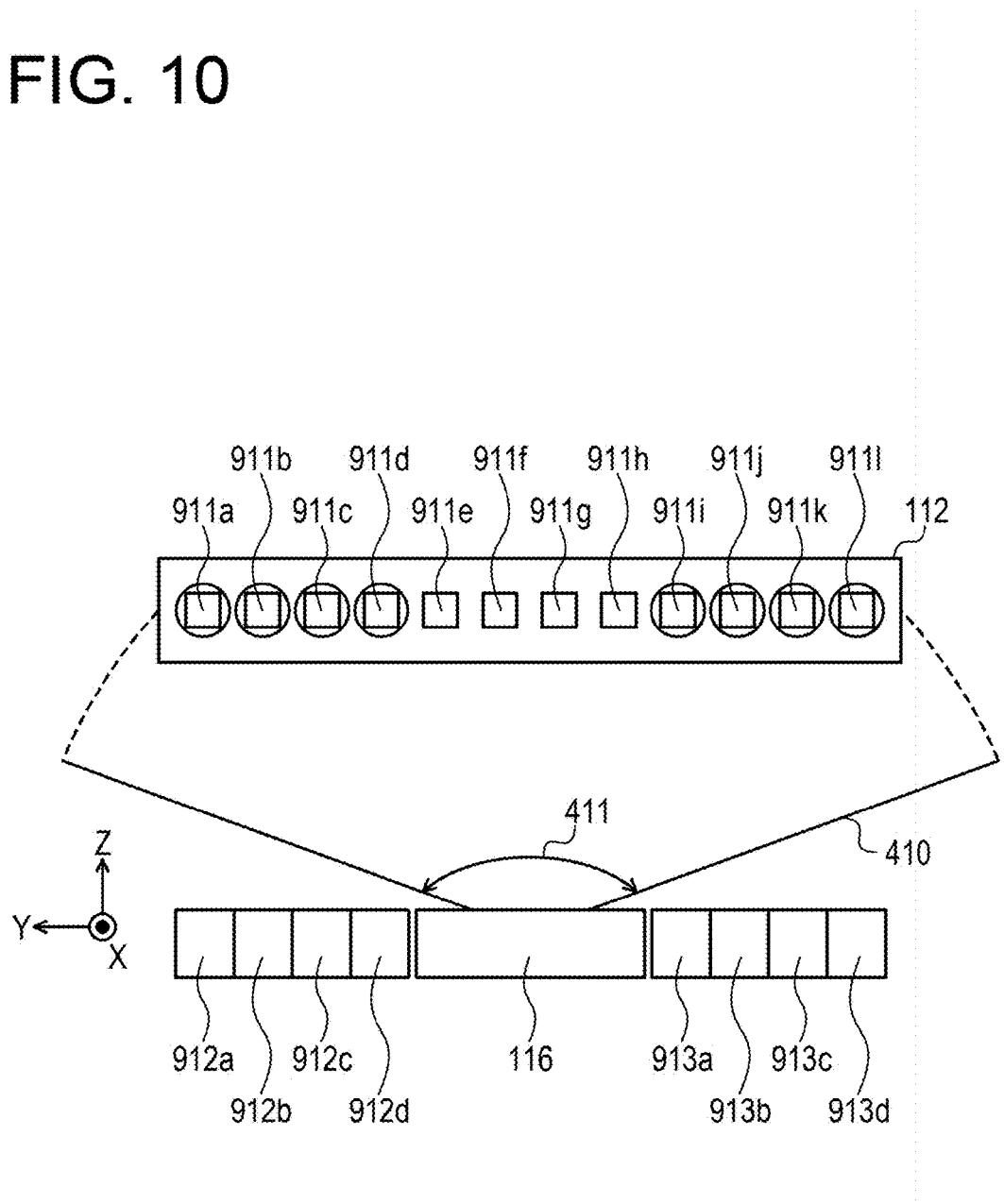
FIG. 10 is a cross-sectional view illustrating an example of irradiation of visible light by an LED (YZ plane) of the optical transmission system according to Second Embodiment.

FIG. 10 is a cross-sectional view illustrating an example of irradiation of visible light by the LED of the optical transmission system (YZ plane) according to Second Embodiment. In FIG. 10, the same parts as those illustrated in FIGS. 4 and 9 are indicated with the same reference numerals, and descriptions thereof will be omitted. FIG. 10 illustrates a cross-section of the waveguide 112, the VCSELs 912a to 912d, the PDs 913a to 913d, and the LED 116 illustrated in FIG. 9 which have been cut along the YZ plane.

As illustrated in FIG. 10, in the configuration illustrated in FIG. 9, for example, even when the LED 116 is not precisely positioned on the XY plane, the visible light 410 from the LED 116 may be incident to the cores 921a to 921l. Descriptions have been made on the irradiation of the visible light by the LED 116 of the first optical transceiver 110, but the same applies to the irradiation of the visible light by the LED 126 of the second optical transceiver 120.

(Visible Light at an End Portion of the Fiber Cable of the Optical Transmission System According to Second Embodiment)

Figure 11:
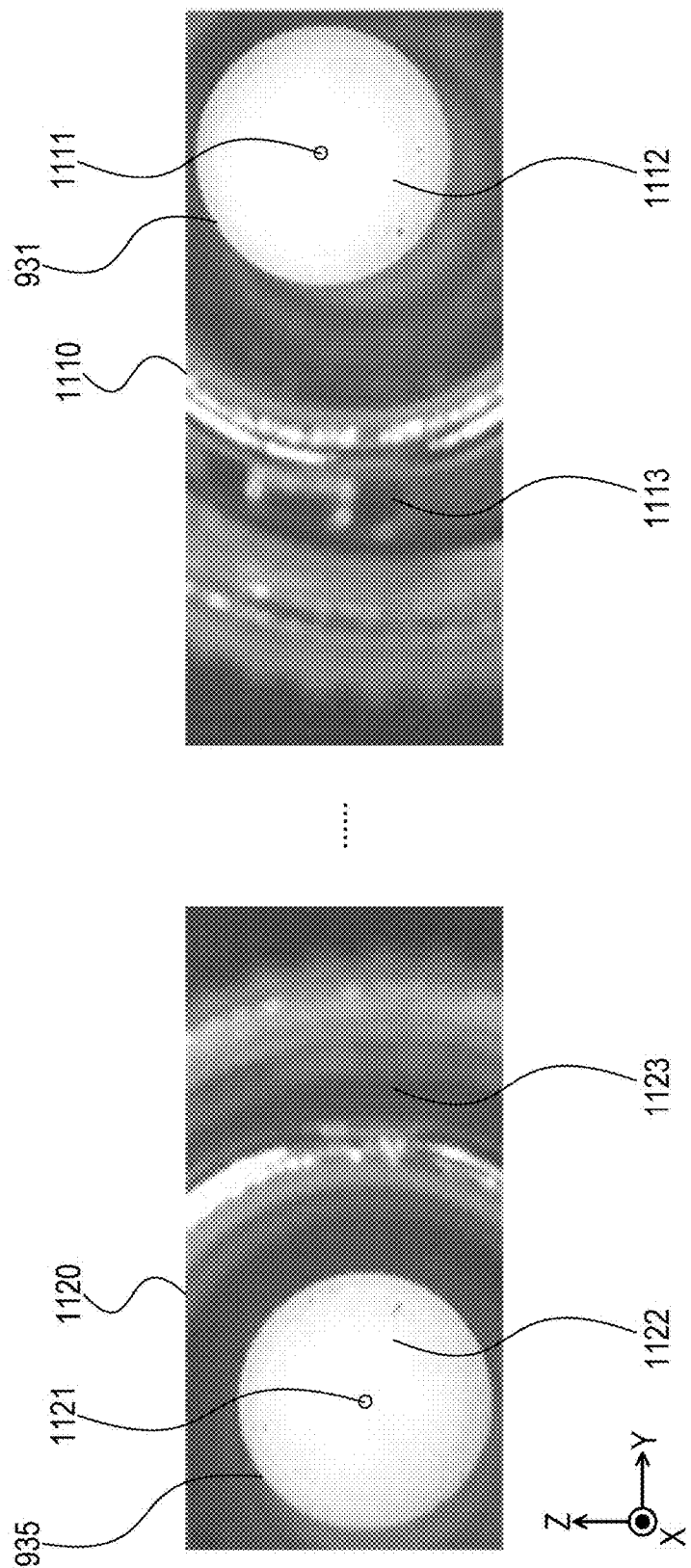
FIG. 11 is a diagram (part 1) illustrating an example of visible light at an end portion of a fiber cable of the optical transmission system according to Second Embodiment.
Figure 12:
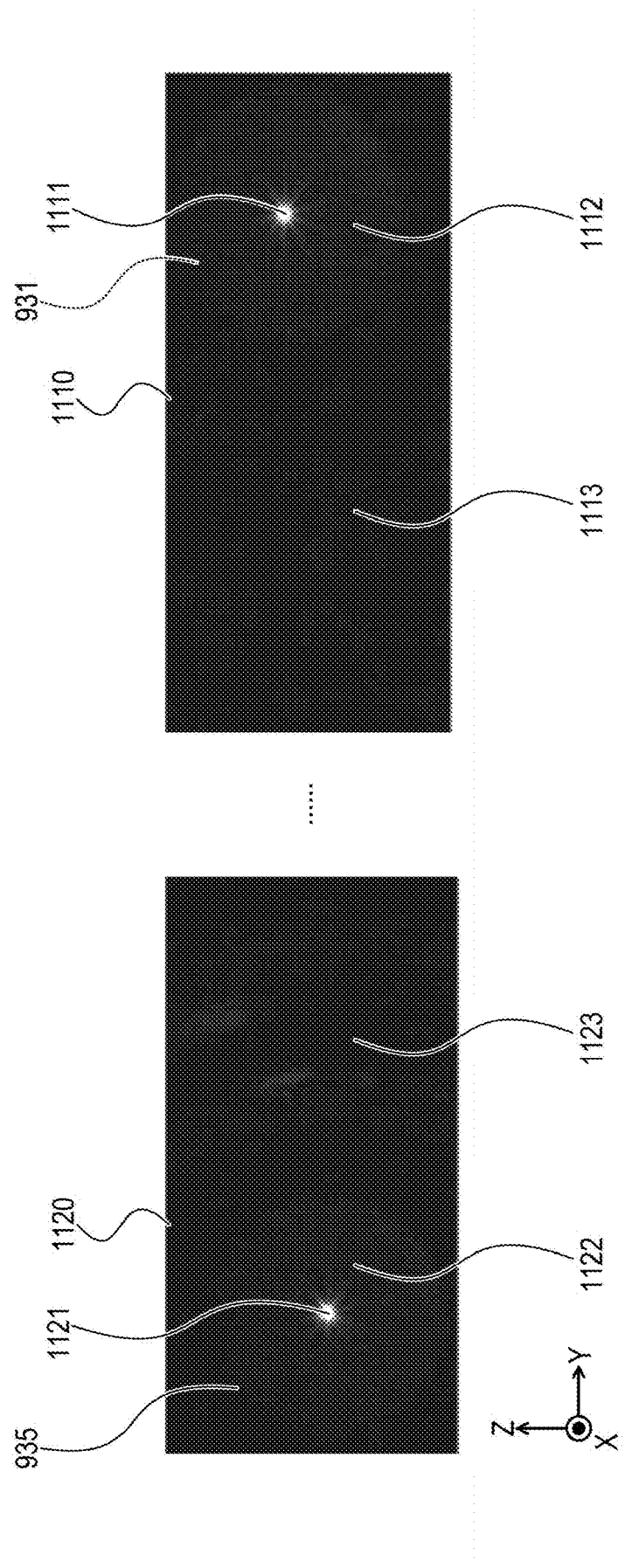
FIG. 12 is a diagram (part 2) illustrating an example of visible light at the end portion of the fiber cable of the optical transmission system according to Second Embodiment.

FIGS. 11 and 12 are diagrams illustrating examples of visible light at an end portion of the fiber cable of the optical transmission system according to Second Embodiment. FIGS. 11 and 12 illustrate a case where in the first optical transceiver 110, in a state where the VCSEL 912a stops light emission and the LED 116 emits light, the optical connector 132 is taken off from the second optical transceiver 120. Further, FIG. 11 illustrates the state where there is ambient light around the end portion of the taken-off optical connector 132, and FIG. 12 illustrates the state where there is no ambient light around the end portion of the optical connector 132.

An end portion 1110 illustrated in FIGS. 11 and 12 indicates an end portion of the taken-off optical connector 132 corresponding to the fiber 931. A core 1111 is a core of the fiber 931. A clad 1112 is a clad that surrounds the core 1111. A protective covering 1113 is a protective covering that surrounds the clad 1112. Further, in FIG. 12, since there is no ambient light, only the core 1111 of the fiber 931 which emits with visible light is visible.

An end portion 1120 illustrated in FIGS. 11 and 12 indicates a portion of the taken-off optical connector 132 corresponding to the fiber 935. A core 1121 is a core of the fiber 935. A clad 1122 is a clad that surrounds the core 1121. A protective covering 1123 is a protective covering that surrounds the clad 1122. Further, in FIG. 12, since there is no ambient light, only the core 1121 of the fiber 935 which emits with visible light is visible.

As illustrated in FIGS. 11 and 12, when an abnormality is detected, the LED 116 is made to emit light, so that when the fiber cable 130 does not have an abnormality, the visible light of the LED 116 may be normally and visually recognized at the end portion of the optical connector 132. Accordingly, it may be determined that the fiber cable 130 has no abnormality. In the meantime, when the fiber cable 130 has the abnormality, the visible light illustrated in FIGS. 11 and 12 may not be visually recognized at the end portion of the optical connector 132. Accordingly, it may be determined that the fiber cable 130 has an abnormality.

(Another Example of the Optical Transmission System According to Second Embodiment)

Figure 13:
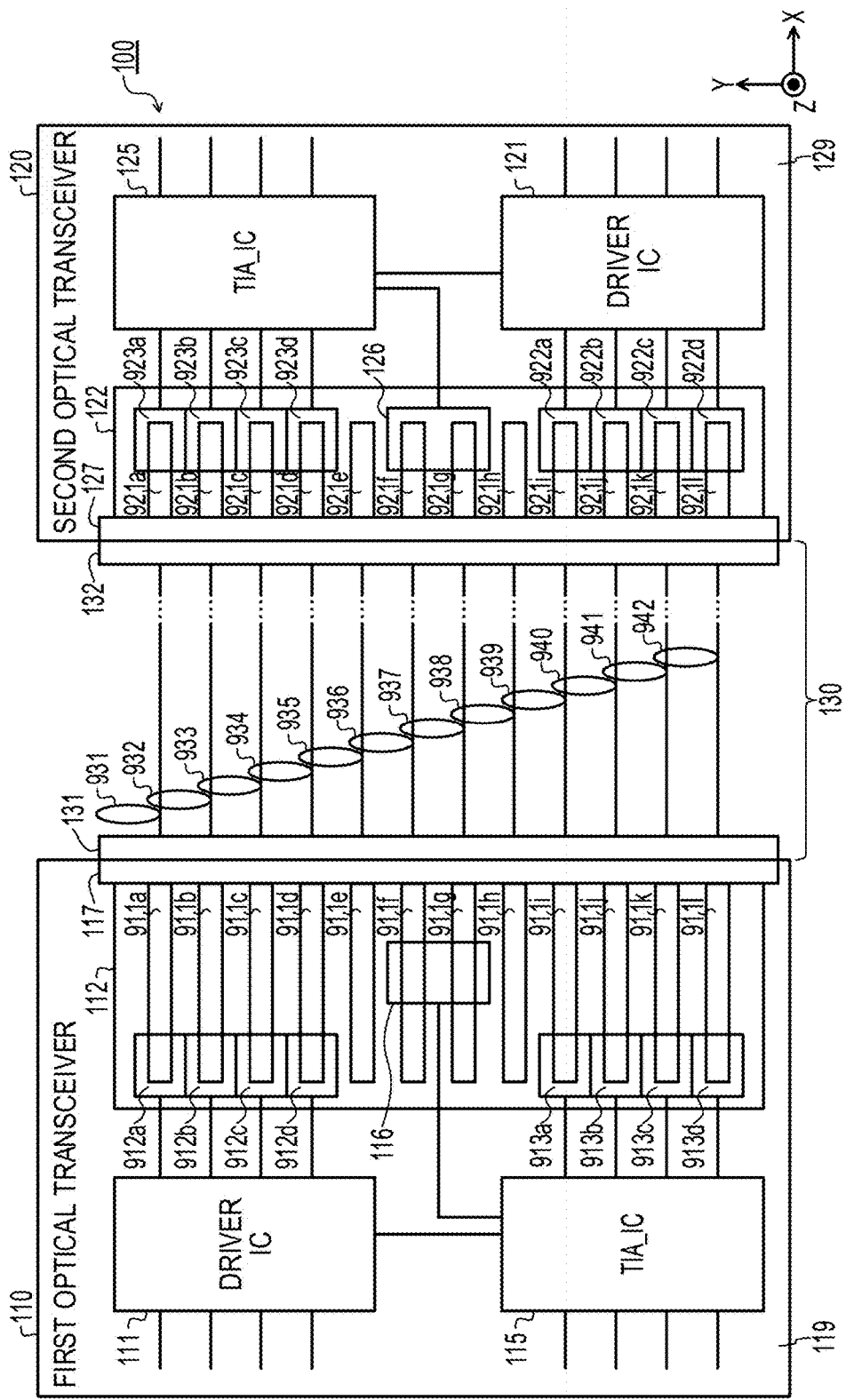
FIG. 13 is a diagram illustrating another example of the optical transmission system according to Second Embodiment.

FIG. 13 is a diagram illustrating another example of the optical transmission system according to Second Embodiment. In FIG. 13, the same parts as those illustrated in FIG. 9 are indicated with the same reference numerals, and descriptions thereof will be omitted. As illustrated in FIG. 13, the location of the LED 116 of the first optical transceiver 110 on the X-axis may be different from the locations of the VCSELs 912a to 912d and the PDs 913a to 913d. In FIG. 13, another example of the disposition of the LED 116 has been described, but similarly, the location of the LED 126 of the second optical transceiver 120 on the X-axis may also be different from those of the VCSELs 922a to 922d and the PDs 923a to 923d.

(Wire Connection of the LED According to Second Embodiment)

Figure 14:
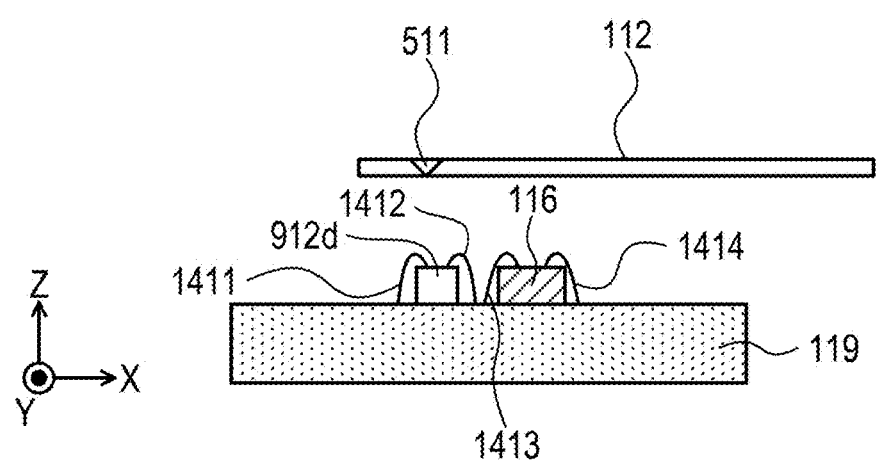
FIG. 14 is a cross-sectional view illustrating an example of a wire connection of the LED according to Second Embodiment.

FIG. 14 is a cross-sectional view illustrating an example of a wire connection of the LED according to Second Embodiment. In FIG. 14, the same parts as those illustrated in FIG. 13 are indicated with the same reference numerals, and descriptions thereof will be omitted. FIG. 14 illustrates cross-sections of the waveguide 112, the base 119, and the LED 116 of the first optical transceiver 110 illustrated in FIG. 13 which have been cut along the XZ plane.

As illustrated in FIG. 14, the VCSEL 912d is connected to the base 119 by wires 1411 and 1412. Further, the VCSELs 912a to 912c or the PDs 913a to 913d are connected to the base 119 by the wires identically to the VCSEL 912d. Further, the LED 116 is connected to the base 119 by wires 1413 and 1414.

As illustrated in FIG. 14, the VCSELs 912a to 912d, the PDs 913a to 913d, and the LED 116 may be, for example, wire-connected to the base 119. Further, identically to the first optical transceiver 110, in the second optical transceiver 120, the VCSELs 922a to 922d, the PDS 923a to 923d, and the LED 126 may be, for example, wire-connected to the base 129. Further, similarly, the wire connection is available in the first optical transceiver 110 or the second optical transceiver 120 according to First Embodiment.

(Flip-chip Connection of the LED According to Second Embodiment)

Figure 15:
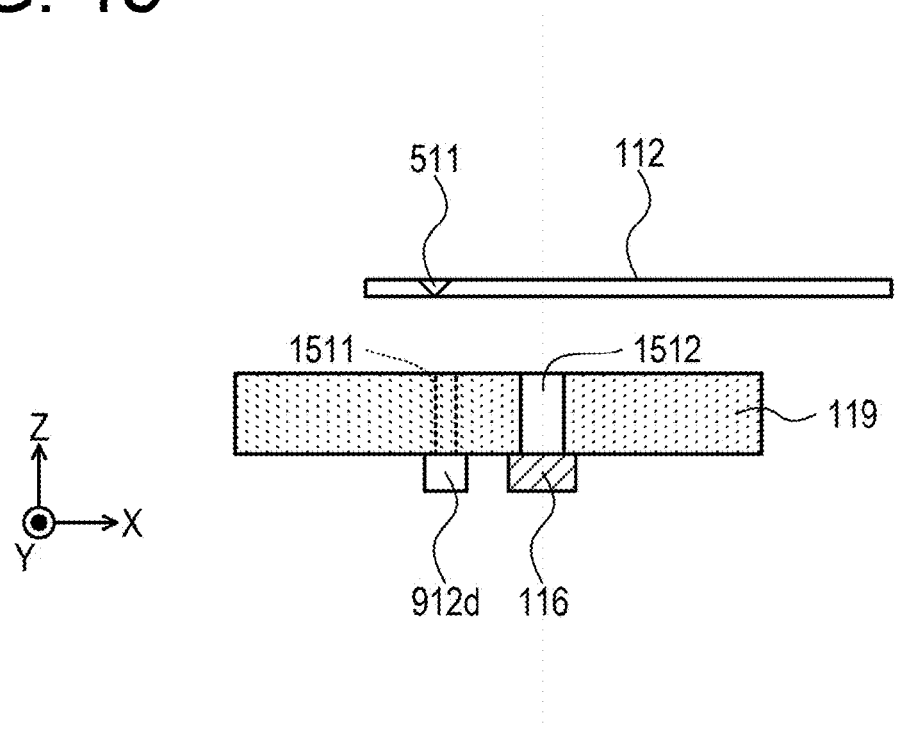
FIG. 15 is a cross-sectional view illustrating an example of a flip-chip connection of the LED according to Second Embodiment.

FIG. 15 is a cross-sectional view illustrating an example of a flip-chip connection of the LED according to Second Embodiment. In FIG. 15, the same parts as those illustrated in FIG. 13 are indicated with the same reference numerals, and descriptions thereof will be omitted. FIG. 15 illustrates cross-sections of the waveguide 112, the base 119, and the LED 116 of the first optical transceiver 110 illustrated in FIG. 13 which have been cut along the XZ plane.

As illustrated in FIG. 15, the VCSEL 912d is flip-chip connected to the rear surface of the base 119 and emits an optical signal to the waveguide 112 via a via 1511 provided in the base 119. Further, similarly to the VCSEL 912d, the VCSELs 912a to 912c are provided on the rear surface of the base 119 and emit optical signals to the waveguide 112 via the via provided in the base 119.

Similarly to the VCSEL 912d, the PDs 913a to 913d are provided on the rear surface of the base 119. Then, the PDs 913a to 913d receive the optical signal from the waveguide 112 via the via provided in the base 119. Further, the LED 116 is flip-chip connected to the rear surface of the base 119, similarly to the VCSEL 912d, and emits visible light to the waveguide 112 via a via 1512 provided in the base 119.

As illustrated in FIG. 15, the VCSELs 912a to 912d, the PDS 913a to 913d, and the LED 116 may be, for example, flip-chip connected to the base 119. Further, similarly to the first optical transceiver 110, in the second optical transceiver 120, the VCSELs 922a to 922d, the PDS 923a to 923d, and the LED 126 may be, for example, flip-chip connected to the base 129. Further, similarly, the flip-chip connection is available in the first optical transceiver 110 or the second optical transceiver 120 according to First Embodiment.

(Mirror Backside Irradiation of the LED According to Second Embodiment)

Figure 16:
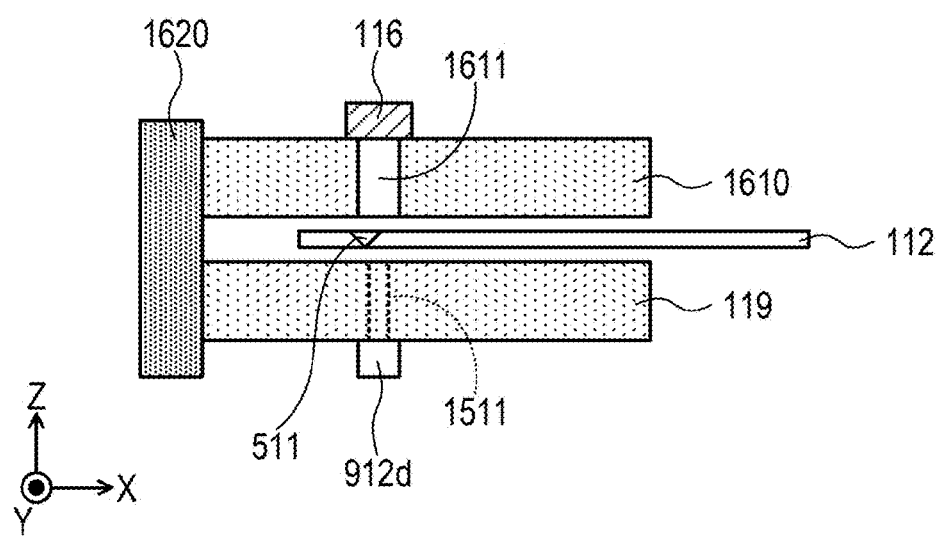
FIG. 16 is a cross-sectional view illustrating an example of mirror backside irradiation of the LED according to Second Embodiment.

FIG. 16 is a cross-sectional view illustrating an example of mirror backside irradiation of the LED according to Second Embodiment. In FIG. 16, the same parts as those illustrated in FIG. 15 are indicated with the same reference numerals, and descriptions thereof will be omitted. FIG. 15 illustrates cross-sections of the waveguide 112, the base 119, and the LED 116 of the first optical transceiver 110 illustrated in FIG. 13 which have been cut along the XZ plane.

In the example illustrated in FIG. 16, a base 1610 is provided at the side of the waveguide 112 opposite to the base 119. The base 1610 is electrically connected with the base 119 via an electric connector 1620. The LED 116 is flip-chip connected to a surface of the base 1610 opposite to the waveguide 112, and emits visible light to the waveguide 112 via a via 1611 provided in the base 1610. In the example illustrated in FIG. 16, the first optical transceiver 110 has a mirror backside irradiation configuration in which the LED 116 emits visible light from the backside of the mirror 511 of the waveguide 112 to the waveguide 112.

As illustrated in FIG. 16, the first optical transceiver 110 may have a mirror backside irradiation configuration in which the LED 116 is provided on the base 1610 opposite to the base 119 in the waveguide 112. Further, similarly to the first optical transceiver 110, the second optical transceiver 120 may also have a mirror backside irradiation configuration in which the LED 126 is provided on a base opposite to the base 129 in the waveguide 122. Further, similarly, the mirror backside irradiation configuration is available in the first optical transceiver 110 or the second optical transceiver 120 according to First Embodiment.

(Another Example of a Wire Connection of the LED According to Second Embodiment)

Figure 17:
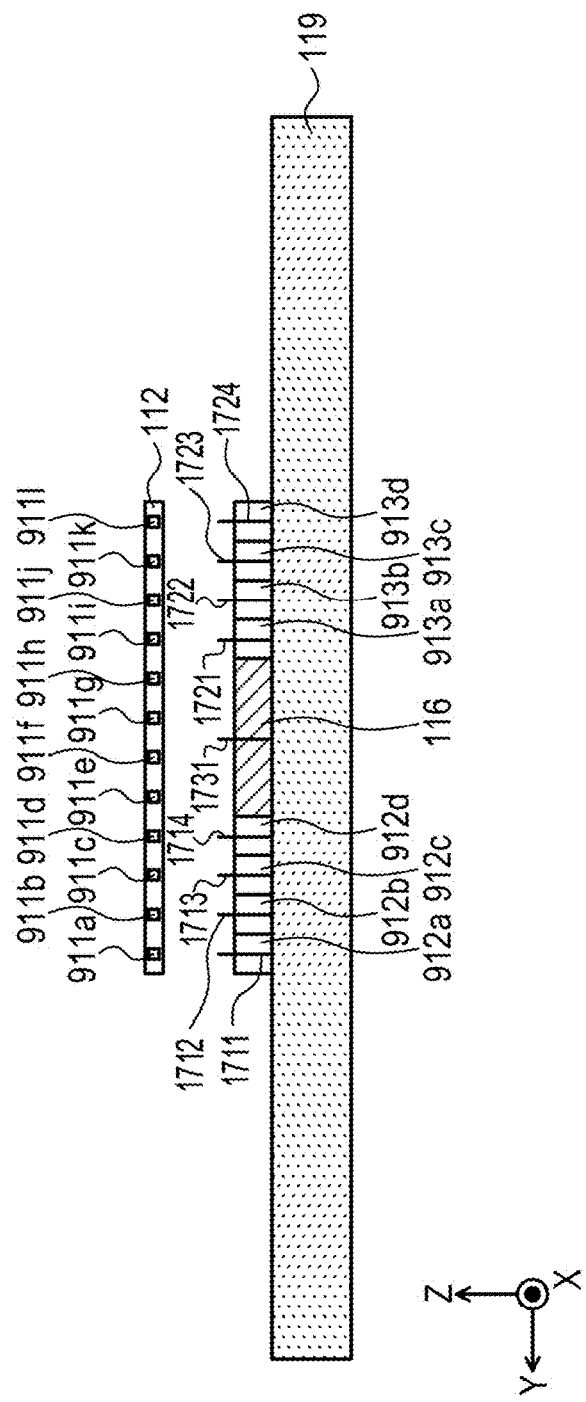
FIG. 17 is a cross-sectional view illustrating another example of the wire connection of the LED according to Second Embodiment.

FIG. 17 is a cross-sectional view illustrating another example of a wire connection of the LED according to Second Embodiment. In FIG. 17, the same parts as those illustrated in FIG. 9 are indicated with the same reference numerals, and descriptions thereof will be omitted. FIG. 17 illustrates cross-sections of, for example, the waveguide 112, the base 119, the VCSELs 912a to 912d, the PDs 913a to 913d, and the LED 116 which have been cut along the YZ plane in the configuration in which the LED 116, the respective VCSELs, and the respective PDs illustrated in FIG. 9 are provided at the same position on the X-axis.

As illustrated in FIG. 17, the VCSELs 912a to 912d are connected to the base 119 by wires 1711 to 1714, respectively. Further, the PDs 913a to 931d are connected to the base 119 by wires 1721 to 1724, respectively. Further, the LED 116 is connected to the base 119 by a wire 1731.

As illustrated in FIG. 17, the VCSELs 912a to 912d, the PDs 913a to 913d, and the LED 116 may be, for example, wire-connected to the base 119. Further, similarly to the first optical transceiver 110, in the second optical transceiver 120 illustrated in FIG. 9, the VCSELs 922a to 922d, the PDs 923a to 923d, and the LED 126 may be, for example, wire-connected to the base 129.

(Another Example of a Flip-chip Connection of the LED According to Second Embodiment)

Figure 18:
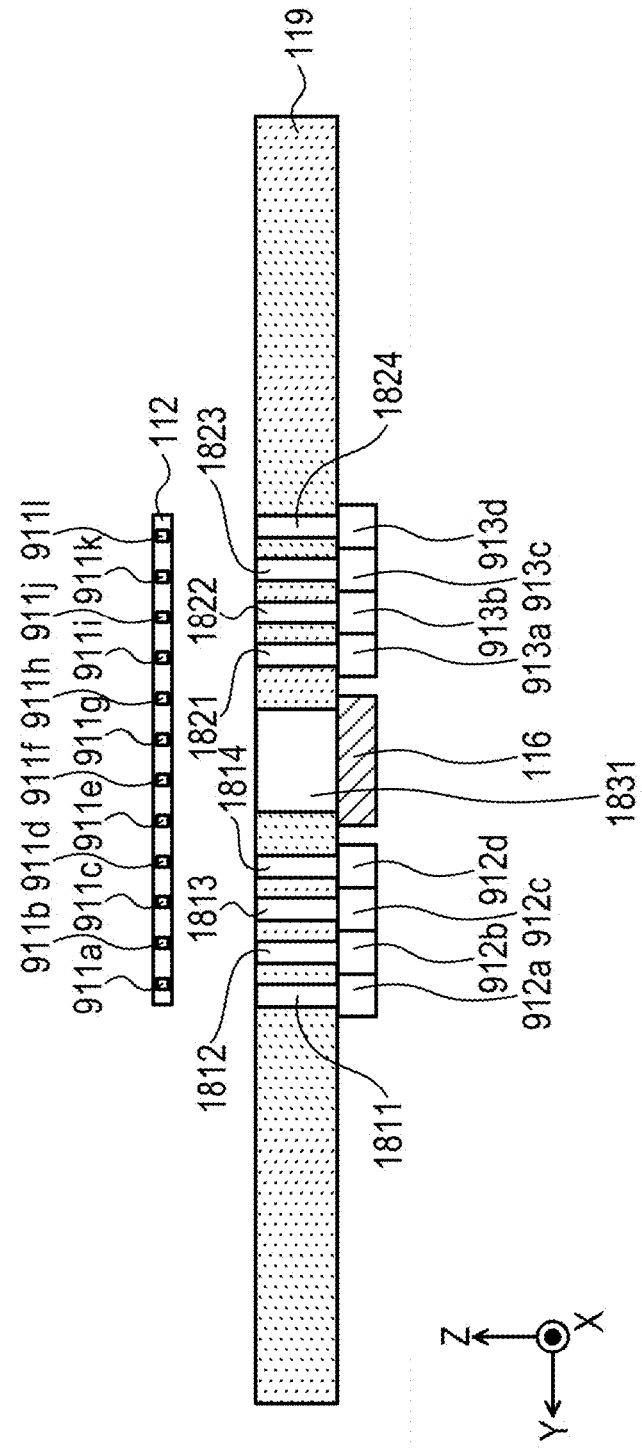
FIG. 18 is a cross-sectional view illustrating another example of the flip-chip connection of the LED according to Second Embodiment.

FIG. 18 is a cross-sectional view illustrating another example of the flip-chip connection of the LED according to Second Embodiment. In FIG. 18, the same parts as those illustrated in FIG. 9 are indicated with the same reference numerals, and descriptions thereof will be omitted. FIG. 18 illustrates cross-sections of, for example, the waveguide 112, the base 119, the VCSELs 912 to 912d, the PDs 913a to 913d, and the LED 116 which have been cut along the YZ plane in the configuration in which the LED 116, the respective VCSELs, and the respective PDs illustrated in FIG. 9 are provided at the same position on the X-axis.

The VCSELs 912a to 912d are flip-chip connected to the rear surface of the base 119, and emit optical signals to the waveguide 112 via vias 1811 to 1814 provided in the base 119, respectively. The PDs 913a to 913d are flip-chip connected to the rear surface of the base 119, and receive the optical signals from the waveguide 112 via vias 1821 to 1824 provided in the base 119, respectively. The LED 116 is flip-chip connected to the rear surface of the base 119, and emits visible light to the waveguide 112 via a via 1831 provided in the base 119.

As illustrated in FIG. 18, the VCSELs 912a to 912d, the PDs 913a to 913d, and the LED 116 may be, for example, flip-chip connected to the base 119. Further, similarly to the first optical transceiver 110, in the second optical transceiver 120 illustrated in FIG. 9, the VCSELs 922a to 922d, the PDs 923a to 923d, and the LED 126 may be, for example, flip-chip connected to the base 129.

(Configuration in Which an Optical Coupling Connector is used in the Optical Transceiver According to Second Embodiment)

Figure 19:
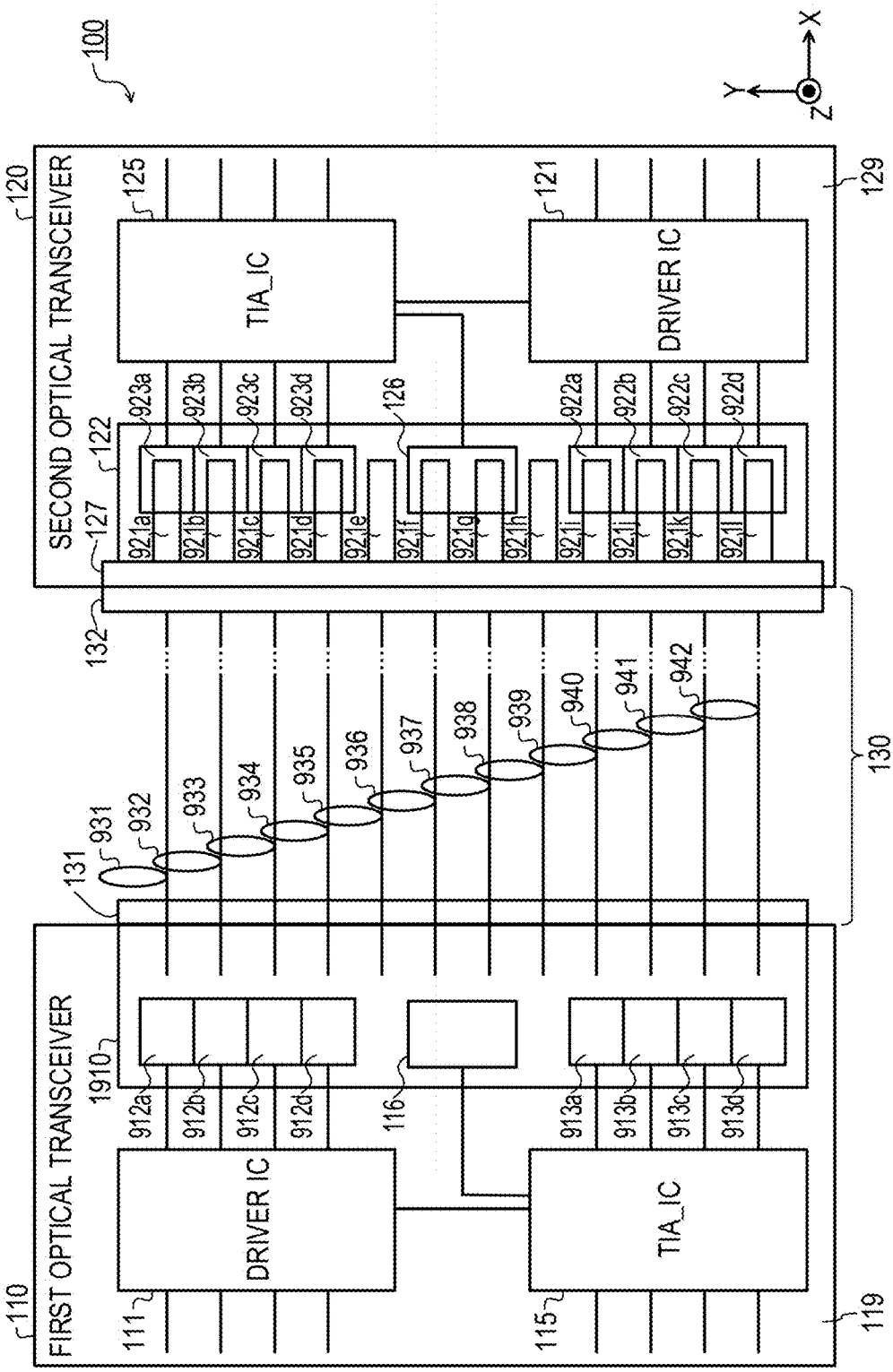
FIG. 19 is a diagram illustrating an example of a configuration in which an optical coupling connector is used in an optical transceiver according to Second Embodiment.

FIG. 19 is a diagram illustrating an example of a configuration in which an optical coupling connector is used in the optical transceiver according to Second Embodiment. In FIG. 19, the same parts as those illustrated in FIG. 9 are indicated with the same reference numerals, and descriptions thereof will be omitted. As illustrated in FIG. 19, the first optical transceiver 110 according to Second Embodiment may include, for example, an optical coupling connector 1910, instead of the waveguide 112 and the optical connector 117 illustrated in FIG. 9.

The optical coupling connector 1910 couples the optical signals emitted from the VCSELs 912a to 912d to the fibers 931 to 934 of the fiber cable 130, respectively. Further, the optical coupling connector 1910 emits the optical signals emitted from the fibers 939 to 942 of the fiber cable 130 to the PDs 913a to 913d, respectively. Further, the optical coupling connector 1910 couples the visible light emitted from the LED 116 to at least one of the fibers 931 to 942 of the fiber cable 130.

The optical connector 131 of the fiber cable 130 is an optical connector detachable from the optical coupling connector 1910 of the first optical transceiver 110. As illustrated in FIG. 19, the first optical transceiver 110 may be configured to be connected with the fiber cable 130 by the optical coupling connector 1910. Further, identically to the first optical transceiver 110, the second optical transceiver 120 may be configured to be connected with the fiber cable 130 by the optical coupling connector. Further, identically, the first optical transceiver 110 or the second optical transceiver 120 according to First Embodiment may be configured to be connected with the fiber cable 130 by the optical coupling connector 1910.

(Mirror Attached Connector Type Configuration of the Optical Coupling Connector According to Second Embodiment)

Figure 20:
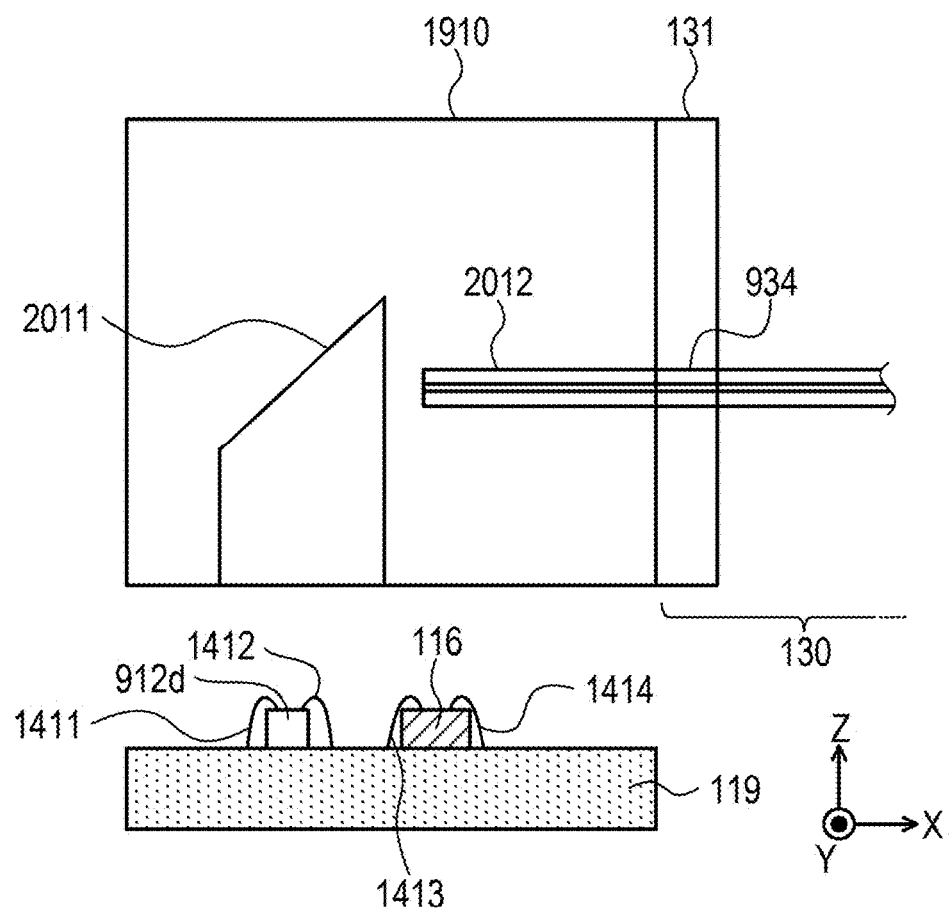
FIG. 20 is a cross-sectional view illustrating an example of a mirror attached connector type configuration of the optical coupling connector according to Second Embodiment.

FIG. 20 is a cross-sectional view illustrating an example of a mirror attached connector type configuration of the optical coupling connector according to Second Embodiment. In FIG. 20, the same parts as those illustrated in FIGS. 14 and 19 are indicated with the same reference numerals, and descriptions thereof will be omitted. FIG. 20 illustrates cross-sections of the optical coupling connector 1910, the base 119, and the VCSEL 912d of the first optical transceiver 110 illustrated in FIG. 19 which have been cut along the XZ plane.

As illustrated in FIG. 20, the optical coupling connector 1910 is a transparent member including a mirror 2011 and a fiber 2012. The mirror 2011 reflects the optical signal emitted from the VCSEL 912d, and emits the reflected optical signal to the fiber 2012. The fiber 2012 propagates the optical signal emitted from the mirror 2011, and emits the propagated optical signal to the fiber 934 of the fiber cable 130. The fiber 934 of the fiber cable 130 propagates the optical signal emitted from the fiber 2012, and emits the propagated optical signal to the second optical transceiver 120.

The optical signal emitted from the VCSEL 912d has been described, but in the same way, the optical coupling connector 1910 emits the optical signals emitted from the VCSELs 912a to 912c to the fibers 931 to 933 of the fiber cable 130, respectively. Further, the optical coupling connector 1910 reflects the optical signals emitted from the fibers 939 to 942 of the fiber cable 130 by the mirror 2011, and emits the reflected optical signals to the PDs 913a to 913d, respectively.

For example, when the optical connector 131 of the fiber cable 130 is taken off from the optical coupling connector 1910 of the first optical transceiver 110, the fiber 2012 and the fiber 934 are separated from each other. Then, at this time, when the visible light is emitted from the LED 126 of the second optical transceiver 120 and propagated through the fiber cable 130, the visible light may be visually recognized at the end portion of the taken-off optical connector 131.

As illustrated in FIG. 20, the optical coupling connector 1910 of the first optical transceiver 110 may be configured in the mirror attached connector type. Further, in the case where the second optical transceiver 120 is configured to be connected with the fiber cable 130 by the optical coupling connector, the optical coupling connector may be configured in the mirror attached connector type.

In the example illustrated in FIG. 20, the configuration in which the respective VCSELs, the respective PDs, and the LED 116 are wire-connected to the base 119 has been described, but the respective VCSELs, the respective PDs, and the LED 116 may be configured to be flip-chip connected to the base 119.

(Fiber Band Type Configuration of the Optical Coupling Connector According to Second Embodiment)

Figure 21:
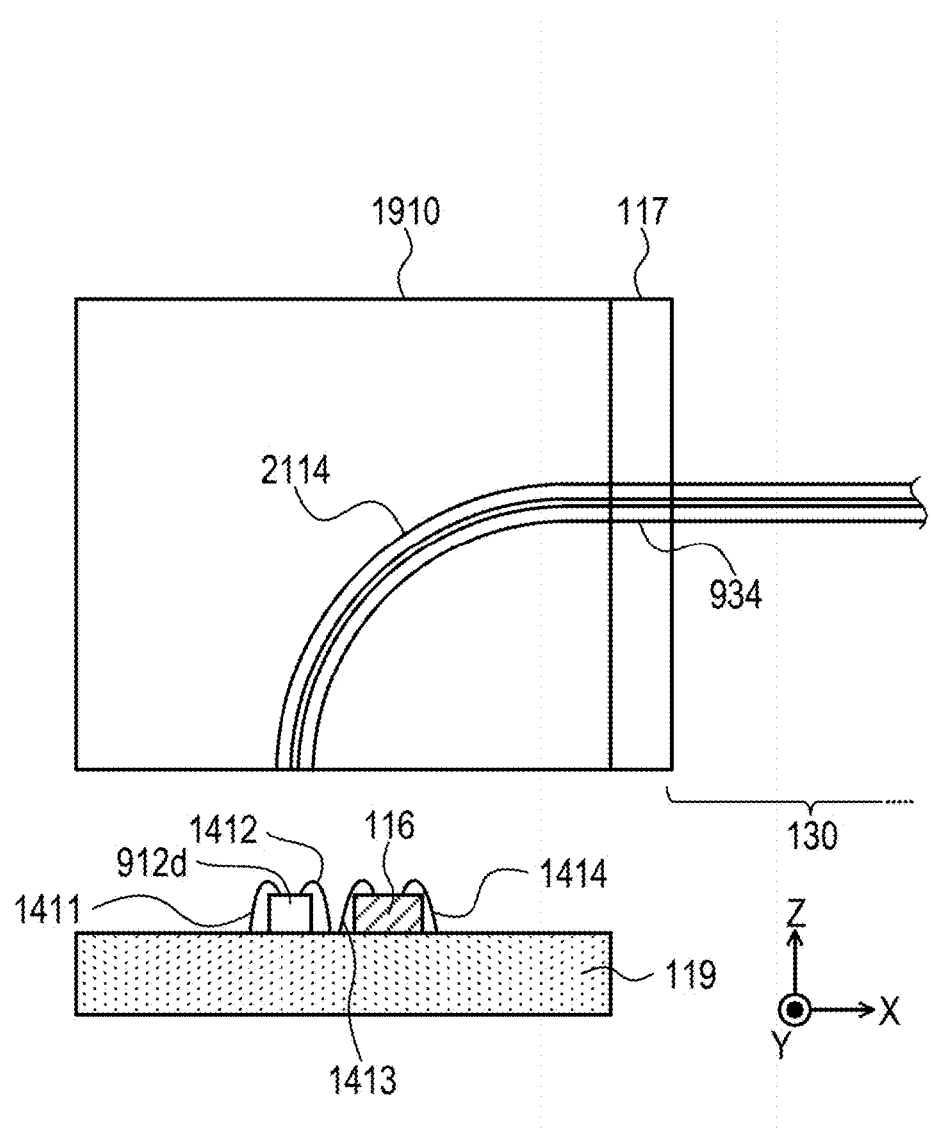
FIG. 21 is a cross-sectional view (part 1) illustrating an example of a fiber band type configuration of the optical coupling connector according to Second Embodiment.
Figure 22:
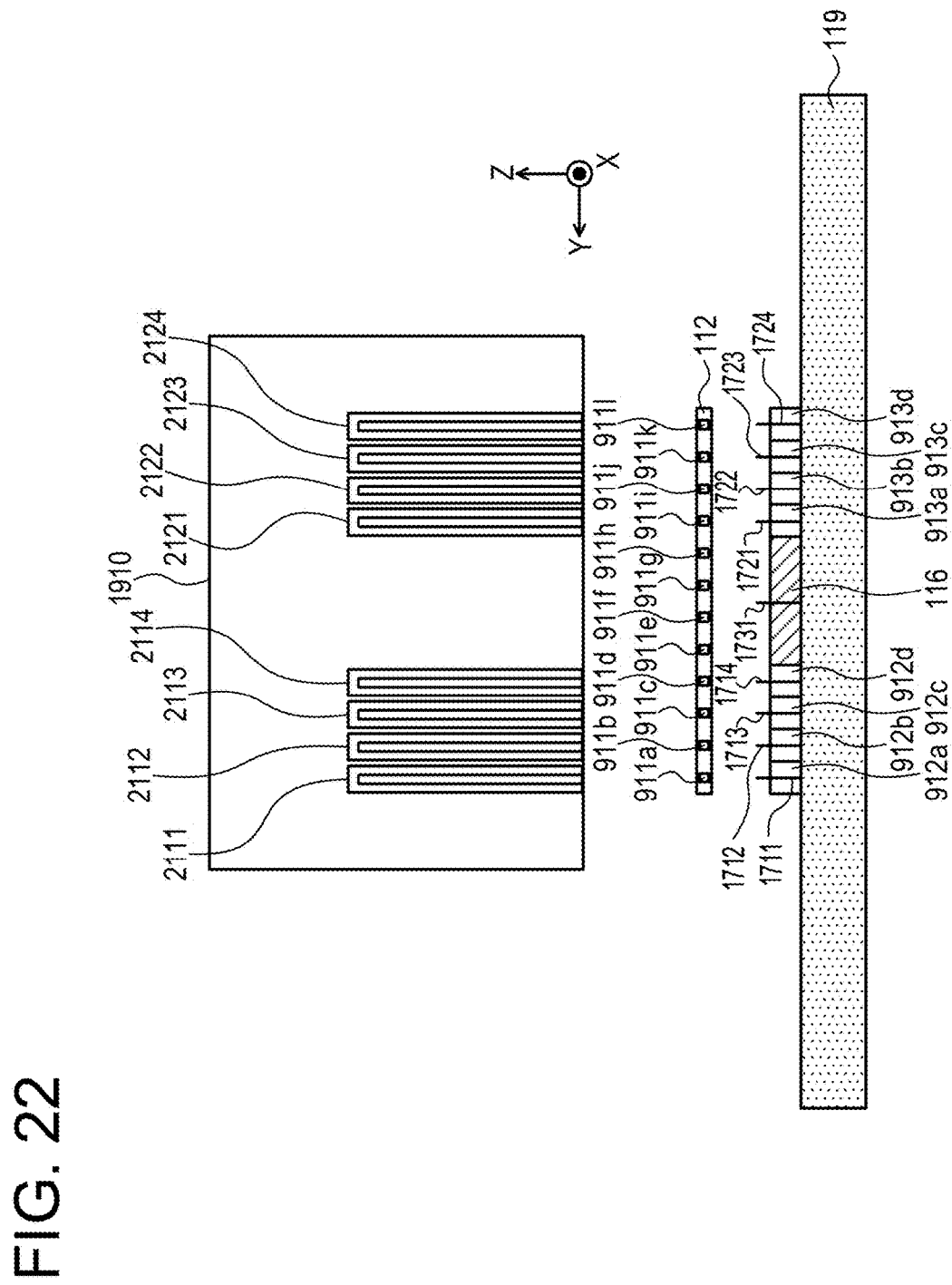
FIG. 22 is a cross-sectional view (part 2) illustrating an example of the fiber band type configuration of the optical coupling connector according to Second Embodiment.

FIGS. 21 and 22 are cross-sectional views illustrating an example of a fiber band type configuration of the optical coupling connector according to Second Embodiment. In FIGS. 21 and 22, the same parts as those illustrated in FIGS. 17 and 19 are indicated with the same reference numerals, and descriptions thereof will be omitted. FIG. 21 illustrates cross-sections of the optical coupling connector 1910, the base 119, and the VCSEL 912d of the first optical transceiver 110 illustrated in FIG. 19 which have been cut along the XZ plane. FIG. 22 illustrates cross-sections of the optical coupling connector 1910, the base 119, and the respective VCSELs, the respective PDs, and the LED 116 of the first optical transceiver 110 illustrated in FIG. 19 which have been cut along the YZ plane.

As illustrated in FIGS. 21 and 22, the optical coupling connector 1910 includes curved fibers 2111 to 2114 and 2121 to 2124. For example, the fiber 2114 illustrated in FIG. 21 propagates the optical signal emitted from the VCSEL 912d and emits the propagated optical signal to the fiber 934 of the fiber cable 130. The fiber 934 of the fiber cable 130 propagates the optical signal emitted from the fiber 2114 and emits the propagated optical signal to the second optical transceiver 120.

The optical signal emitted from the VCSEL 912d has been described, but in the same way, the optical coupling connector 1910 emits the optical signals emitted from the VCSELs 912a to 912c to the fibers 931 to 933 by the fibers 2111 to 2113, respectively. Further, the optical coupling connector 1910 emits the optical signals emitted from the fibers 939 to 942 of the fiber cable 130 to the PDs 913a to 913d by the fibers 2121 to 2124, respectively.

For example, when the optical connector 131 of the fiber cable 130 is taken off from the optical coupling connector 1910 of the first optical transceiver 110, the fiber 2114 and the fiber 934 are separated from each other. Then, at this time, when the visible light is emitted from the LED 126 of the second optical transceiver 120 and propagated through the fiber cable 130, the visible light may be visually recognized at the end portion of the taken-off optical connector 131.

As illustrated in FIGS. 21 and 22, the optical coupling connector 1910 of the first optical transceiver 110 may be configured in the fiber band type. Further, in the case where the second optical transceiver 120 is configured to be connected with the fiber cable 130 by the optical coupling connector, the optical coupling connector may be configured in the fiber band type.

In the example illustrated in FIGS. 21 and 22, the configuration in which the respective VCSELs, the respective PDs, and the LED 116 are wire-connected to the base 119 has been described, but the respective VCSELs, the respective PDs, and the LED 116 may be configured to be flip-chip connected to the base 119.

(Processing When an Abnormality is Generated in The Optical Transmission System According to Second Embodiment)

The processing when an abnormality is generated in the optical transmission system 100 according to Second Embodiment is similar to, for example, the processing illustrated in FIG. 6. However, in operation S601, the TIA_IC 115 detects an optical input interruption of at least one of the PDs 913a to 913d. Further, in operation S602, the driver IC 111 stops light emission of each of the VCSELs 912a to 912d.

In operation S603, the TIA_IC 125 detects an optical input interruption to each of the PDs 923a to 923d by the stop of the light emission of the VCSELs 912a to 912d of the first optical transceiver 110 in operation S602. Further, in operation S604, the driver IC 121 stops light emission of each of the VCSELs 922a to 922d.

(Operation of Determining the Cause of Abnormality by a Maintainer of the Optical Transmission System 100 According to Second Embodiment)

An operation of determining the cause of abnormality by a maintainer (operator) of the optical transmission system 100 according to Second Embodiment is similar to, for example, the determination operation illustrated in FIG. 7.

As described above, according to the first optical transceiver 110 according to Second Embodiment, the configuration in which the optical transmission is performed by using the 12-core fiber cable 120 may achieve the same effect as that of the first optical transceiver 110 according to First Embodiment.

The fiber cable 130 includes the fibers 931 to 934 (first fibers) which propagate the optical signals transmitted from the VCSELs 912a to 912d. Further, the fiber cable 130 includes the fibers 939 to 942 (second fibers) which propagate the optical signals received by the PDs 913a to 913d. Further, the fiber cable 130 includes the fibers 935 to 938 (third fibers) which are provided between the fibers 931 and 934 and the fibers 939 to 942 and do not propagate the optical signal.

Accordingly, spaces corresponding to the fibers 935 to 938 are present between the VCSELs 912a to 912d corresponding to the fibers 931 to 934 and the PDs 913a to 913d corresponding to the fibers 939 to 942. Accordingly, the LED 116 may be readily provided between the VCSELs 912a to 912d and the PDs 913a to 913d by providing the LED 116 in the spaces.

In Second Embodiment, the configuration in which the optical transmission is performed by using the 12-core fiber cable 130 has been described, but the number of cores of the fiber cable 130 is not limited to 12, and may be a predetermined number.

As described above, according to the optical transceiver, it is possible to confirm whether light reaches up to an end portion of the fiber while protecting the eyes of an operator.

For example, in the related art, an operator in a field of the optical transmission system is required to observe an eye safety and intuitively determine a disconnection of a fiber. In contrast, according to each foregoing embodiment, when the optical transceiver detects an optical input interruption of the PD, the light emission of the VCSEL is stopped and the LED is made to emit light, thereby enabling visible light to be incident to the fiber. Accordingly, it is possible to confirm whether light reaches up to an end portion of the fiber while protecting the eyes of the operator. Accordingly, the operator may intuitively determine a disconnection of the fiber while observing an eye safety.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transceiver comprising:
   a laser light source configured to transmit a first optical signal via a first optical transmission member;
   a photodetector configured to receive a second optical signal via a second optical transmission member;
   a visible light source configured to emit visible light which is incident to the first optical transmission member and the second optical transmission member; and
   a control circuit configured to, when the photodetector detects that the second optical signal is not received, control the laser light source to stop transmitting the first optical signal and the visible light source to start emitting the visible light,
   the visible light source is provided between the laser light source and the photodetector when viewed in a direction orthogonal to surfaces supporting the optical transceiver such that the visible light source is capable of introducing the visible light to the first optical transmission member and the second optical transmission member simultaneously.

2. The optical transceiver according to claim 1, wherein the visible light source emits diffused visible light.

3. The optical transceiver according to claim 1, further comprising:
   a third optical transmission member provided between the first optical transmission member and the second optical transmission member, and
   wherein the third optical transmission member does not propagate an optical signal.

4. The optical transceiver according to claim 1, wherein the first optical transmission member and the second optical transmission member are detachable from another optical transceiver to receive the first optical signal and transmit the second optical signal, respectively.

5. A control method of an optical transceiver including a laser light source and a photodetector, the control method comprising:
   providing a visible light source between the laser light source and the photodetector when viewed in a direction orthogonal to surfaces supporting the optical transceiver, the laser light source transmitting a first optical signal via a first optical transmission member and the photodetector receiving a second optical signal via a second optical transmission member;

when the photodetector of the optical transceiver detects that the second optical signal is not received, causing the laser light source not to transmit the first optical signal; and causing the visible light source to emit the visible light to the first optical transmission member and the second optical transmission member simultaneously.

6. The optical transceiver according to claim 1, wherein a radiation angle of the visible light emitted by the visible light source is larger than that of the first optical signal transmitted by the laser light source.

* * * * *